(12) United States Patent
Asano

(10) Patent No.: US 9,215,441 B2
(45) Date of Patent: Dec. 15, 2015

(54) IMAGE PROCESSING APPARATUS, NON-TRANSITORY COMPUTER READABLE RECORDING MEDIUM, AND IMAGE PROCESSING METHOD

(75) Inventor: Motohiro Asano, Osaka (JP)

(73) Assignee: KONICA MINOLTA, INC., Tokyo (JP)

( * ) Notice: Subject to any disclaimer, the term of this patent is extended or adjusted under 35 U.S.C. 154(b) by 264 days.

(21) Appl. No.: 13/982,670

(22) PCT Filed: Jan. 27, 2012

(86) PCT No.: PCT/JP2012/051747
§ 371 (c)(1),
(2), (4) Date: Jul. 30, 2013

(87) PCT Pub. No.: WO2012/111404
PCT Pub. Date: Aug. 23, 2012

(65) Prior Publication Data
US 2013/0308826 A1    Nov. 21, 2013

(30) Foreign Application Priority Data

Feb. 17, 2011    (JP) .................................. 2011-031998

(51) Int. Cl.
*H04N 13/00* (2006.01)
*H04N 13/02* (2006.01)
*G06T 5/00* (2006.01)
*G06T 5/50* (2006.01)

(52) U.S. Cl.
CPC ............ *H04N 13/0022* (2013.01); *G06T 5/002* (2013.01); *G06T 5/50* (2013.01); *H04N 13/0271* (2013.01); *G06T 2207/10021* (2013.01); *H04N 2213/003* (2013.01)

(58) Field of Classification Search
None
See application file for complete search history.

(56) References Cited

U.S. PATENT DOCUMENTS

| 5,699,444 | A | * | 12/1997 | Palm | ...................... | G01C 11/06 348/42 |
| 5,748,199 | A | * | 5/1998 | Palm | .................. | H04N 13/0014 345/419 |
| 5,860,912 | A | * | 1/1999 | Chiba | ................ | A61B 1/00059 348/45 |

(Continued)

FOREIGN PATENT DOCUMENTS

| JP | 2003-317117 | 7/2003 |
| JP | 2011-504262 A | 3/2011 |

OTHER PUBLICATIONS

International Search Report in International Application No. PCT/JP2012/0517477 mailed Apr. 17, 2012, 1 page.

*Primary Examiner* — Tsung-Yin Tsai
(74) *Attorney, Agent, or Firm* — Brinks Gilson & Lione

(57) ABSTRACT

A technique that enables an image distortion caused on a pseudo image of an object to be reduced is provided. In order to achieve the object, an image processor includes a first obtaining section for obtaining a base image, a second obtaining section for obtaining first pieces of distance information, a first generating section for generating second pieces of distance information by executing a process for reducing dispersion of the first pieces of distance information, and a second generating section for generating a pseudo image constituting a stereoscopic image. The first generating section executes the reducing process so that strength for reducing the dispersion of the first pieces of distance information in a second direction crossing a first direction on an original distance image relating to the first pieces of distance information is stronger than strength for reducing the dispersion in the first direction on the original distance image.

13 Claims, 18 Drawing Sheets

(56) References Cited

U.S. PATENT DOCUMENTS

| | | | |
|---|---|---|---|
| 6,137,902 A * | 10/2000 | Kinoshita et al. | G06T 7/0018 382/154 |
| 7,031,512 B2 * | 4/2006 | Ng | G06K 9/20 345/422 |
| 8,411,934 B2 | 4/2013 | Zhang et al. | |
| 8,417,022 B2 * | 4/2013 | Morimitsu | G01C 11/06 340/939 |
| 2003/0169918 A1 * | 9/2003 | Sogawa | H04N 13/0239 382/154 |
| 2011/0044531 A1 * | 2/2011 | Zhang | G06T 7/0075 382/154 |

* cited by examiner

| PIXEL NUMBER OF EACH PIXEL ON PARTIAL IMAGE 23a | 7a | 7b | 7c | 7d | 7e | 7f | 7g | 7h | 7i | 7j |
|---|---|---|---|---|---|---|---|---|---|---|
| X COORDINATE OF EACH PIXEL ON PARTIAL IMAGE 23a | 101 | 102 | 103 | 104 | 105 | 106 | 107 | 108 | 109 | 110 |
| PARALLAX (DISTANCE INFORMATION) | 40 | 40 | 41 | 41 | 41 | 42 | 42 | 41 | 40 | 40 |
| X COORDINATE OF EACH PIXEL ON PARTIAL IMAGE 23b | 61 | 62 | 62 | 63 | 64 | 64 | 65 | 67 | 69 | 70 |
| PIXEL NUMBER OF EACH PIXEL ON PARTIAL IMAGE 23b | 8a | 8b | 8b | 8c | 8d | 8d | 8e | 8g | 8i | 8j |

F I G . 2 5
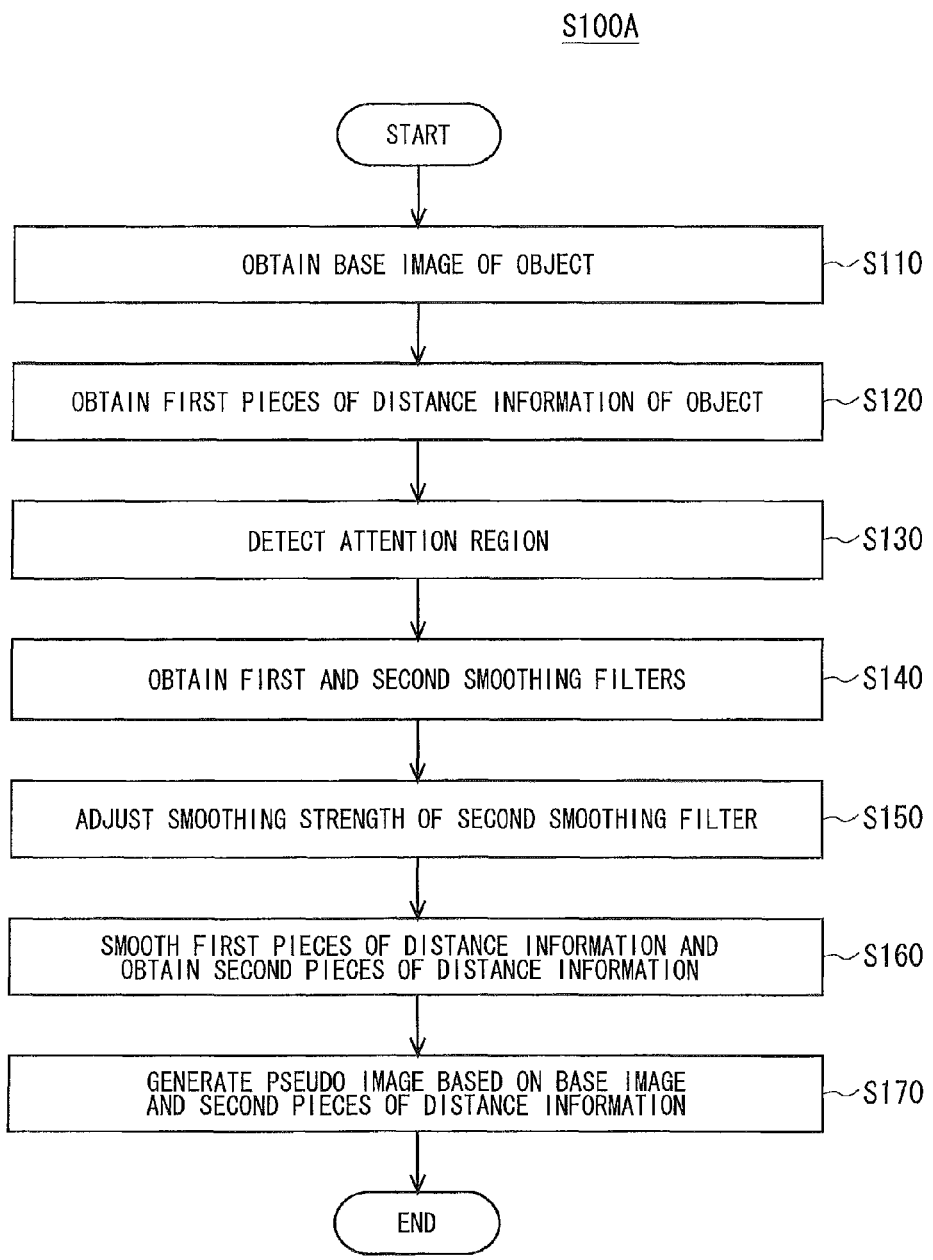

IMAGE PROCESSING APPARATUS, NON-TRANSITORY COMPUTER READABLE RECORDING MEDIUM, AND IMAGE PROCESSING METHOD

TECHNICAL FIELD

The present invention relates to an image processing technique that uses an image of an object captured from one viewpoint so as to generate a pseudo image constituting a stereoscopic image of the object in combination with the image.

BACKGROUND ART

In recent years, a pseudo image generating apparatus, that generates by simulation a pseudo image of an image obtained by imaging an object from a virtual viewpoint that is different from a viewpoint from which the object is actually imaged, without actually imaging the object from the virtual viewpoint, has been started to be used for applications for generating stereoscopically viewable stereoscopic images.

In an image processing system of Japanese Patent Application Laid-Open No. 2003-317117, when a corresponding point search is performed among a plurality of two-dimensional images and a pseudo image for three-dimensional display is obtained from distance information obtained based on a result of searching for the corresponding points, an average value of the distance information obtained by success in the search for the corresponding points is obtained as distance information of a region where the distance information cannot be obtained due to a failure of the corresponding point searching so that a pseudo image is restored. Further, the pseudo image is subject to a smoothing process so that a pseudo image whose smoothness is improved is obtained also in the region where the search for the corresponding points fails.

PRIOR ART DOCUMENT

Patent Document

Patent Document 1: Japanese Patent Application Laid-Open No. 2003-317117

SUMMARY OF THE INVENTION

Problems to be Solved by the Invention

However, in pseudo images generated by an image processing system in Japanese Patent Application Laid-Open No. 2003-317117, an image distortion such as a curvature of image might occur.

The present invention is devised in order to solve the above problem, and its object is to provide a technique that can reduce an image distortion caused on a pseudo image.

Means for Solving the Problem

In order to solve the above problem, an image processing apparatus according to a first aspect includes a first obtaining section for obtaining a base image in which an object is captured, a second obtaining section for obtaining first pieces of distance information each representing distance information of a distance from a predetermined origin position to each of points on the object corresponding to respective pixels of the base image, a first generating section for generating second pieces of distance information by executing a reducing process for reducing dispersion of the first pieces of distance information, and a second generating section for generating a pseudo image constituting a stereoscopic image in combination with the base image based on the base image and the pieces of second distance information, wherein when the base image and the pseudo image are arranged so as to be stereoscopically viewable in one image space, a first direction with respect to the base image is defined by a displacement direction in the image space between the pixel of the base image and the pixel of the pseudo image, they each being corresponding to the same point on the object, and an original distance image is defined by an arrangement of the first pieces of distance information corresponding to a pixel arrangement of the base image, the first generating section executes the reducing process so that strength for reducing the dispersion of the first pieces of distance information in a second direction crossing the first direction on the original distance image is stronger than strength for reducing the dispersion of the first pieces of distance information in the first direction on the original distance image.

An image processing apparatus according to a second aspect is the image processing apparatus according to the first aspect wherein the first generating section executes a smoothing filter process where smoothing strengths in the first direction and the second direction are different from each other so as to execute the reducing process.

An image processing apparatus according to a third aspect is the image processing apparatus according to the first aspect wherein the first generating section executes a process for setting a block region having a vertically long shape such that a length in the second direction is longer than a length in the first direction on the original distance image so as to obtain an average value of pieces of the distance information corresponding to the block region in the first pieces of distance information and obtaining values of pieces of distance information corresponding to the block region in the second pieces of distance information based on the obtained average value while the block region is being moved with respect to the original distance image step by step, so as to execute the reducing process.

An image processing apparatus according to a fourth aspect is the image processing apparatus according to the first aspect where the first generating section reduces dispersion of the first pieces of distance information only in the second direction of the first direction and the second direction on the original distance image so as to execute the reducing process.

An image processing apparatus according to a fifth aspect is the image processing apparatus according to the first aspect further including a detecting section for detecting an attention region, in the image space corresponding to the original distance image, where a distortion of the pseudo image is likely to occur based on a predetermined determination condition, wherein the first generating section executes the reducing process on a region corresponding to the attention region on the original distance image.

An image processing apparatus according to a sixth aspect is the image processing apparatus according to the fifth aspect wherein the detecting section detects the attention region using a geometrical condition of the base image as the determination condition.

An image processing apparatus according to a seventh aspect is the image processing apparatus according to the sixth aspect wherein when a graphic whose shape and size in a coordinate space are specified by giving a concrete numerical value to a predetermined parameter of a mathematical formula is referred to as a basic graphic, the geometrical condition is a ratio of one or more kinds of predetermined basic graphics constituting an outline of the base image.

An image processing apparatus according to an eighth aspect is the image processing apparatus according to the seventh aspect wherein the one or more kinds of the predetermined basic graphics are at least any one of a straight line, a curve of second order, an arc, an elliptic arc, and a predetermined texture.

An image processing apparatus according to a ninth aspect is the image processing apparatus according to the fifth aspect wherein the detecting section detects the attention region using a state of a statistical distribution of the first pieces of distance information as the determination condition.

An image processing apparatus according to a tenth aspect is the image processing apparatus according to the fifth aspect wherein the second obtaining section executes a corresponding point searching process between a reference image in which the object is captured from a viewpoint different from the viewpoint from which the base image is imaged and the base image so as to obtain the first pieces of distance information, and the detecting section detects the attention region using each of correlating values obtained by the corresponding point searching process on the first pieces of distance information as the determination condition.

An image processing apparatus according to an eleventh aspect is the image processing apparatus according to the fifth aspect wherein the determination condition includes a determination rule for giving a quantitative determined result about a likelihood of occurrence of the distortion, and the first generating section changes reduction strength of the dispersion of the attention region in the second direction according to the quantitative determined result of the likelihood of the occurrence of the distortion.

A non-transitory computer readable recording medium storing a computer-readable program according to a twelfth aspect, the program controlling a computer to execute an image processing method, and the image processing method includes a first obtaining step of obtaining a base image in which an object is captured, a second obtaining step of obtaining first pieces of distance information each representing distance information of a distance from a predetermined origin position to each of points on the object corresponding to respective pixels of the base image, a first generating step of generating second pieces of distance information by executing a reducing process for reducing dispersion of the first pieces of distance information, and a second generating step of generating a pseudo image constituting a stereoscopic image in combination with the base image based on the base image and the second pieces of distance information, wherein when the base image and the pseudo image are arranged so as to be stereoscopically viewable in one image space, a first direction with respect to the base image is defined by a displacement direction in the image space between the pixel of the base image and the pixel of the pseudo image, they each being corresponding to the same point on the object, and an original distance image is defined by an arrangement of the first pieces of distance information corresponding to a pixel arrangement of the base image, the reducing process is executed at the first generating step so that strength for reducing the dispersion of the first pieces of distance information in a second direction crossing the first direction on the original distance image is stronger than strength for reducing the dispersion of the first pieces of distance information in the first direction on the original distance image.

An image processing method according to a thirteenth aspect includes a first obtaining step of obtaining a base image in which an object is captured, a second obtaining step of obtaining first pieces of distance information each representing distance information of a distance from a predetermined origin position to each of points on the object corresponding to respective pixels of the base image, a first generating step of generating second pieces of distance information by executing a reducing process for reducing dispersion of the first pieces of distance information, and a second generating step of generating a pseudo image constituting a stereoscopic image in combination with the base image based on the base image and the second pieces of distance information, wherein when the base image and the pseudo image are arranged so as to be stereoscopically viewable in one image space, a first direction with respect to the base image is defined by a displacement direction in the image space between the pixel of the base image and the pixel of the pseudo image, they each being corresponding to the same point on the object, and an original distance image is defined by an arrangement of the first pieces of distance information corresponding to a pixel arrangement of the base image, the reducing process is executed at the first generating step so that strength for reducing the dispersion of the first pieces of distance information in a second direction crossing the first direction on the original distance image is stronger than strength for reducing the dispersion of the first pieces of distance information in the first direction on the original distance image.

Effects of the Invention

With any one of the first to thirteenth invention, the second pieces of distance information are generated so that the dispersion of the second pieces of distance information in the second direction that mainly causes a shape distortion of the pseudo image is smaller than the dispersion of the second pieces of distance information in the first direction, and the pseudo image is generated based on the second pieces of distance information. For this reason, an image distortion caused on the pseudo image can be reduced.

BRIEF DESCRIPTION OF DRAWINGS

FIG. 25 is a diagram illustrating an operation flow of the image processing apparatus according to the embodiment.

EMBODIMENT FOR CARRYING OUT THE INVENTION

Embodiment

<Image Processing System 100A:>

Figure 1:
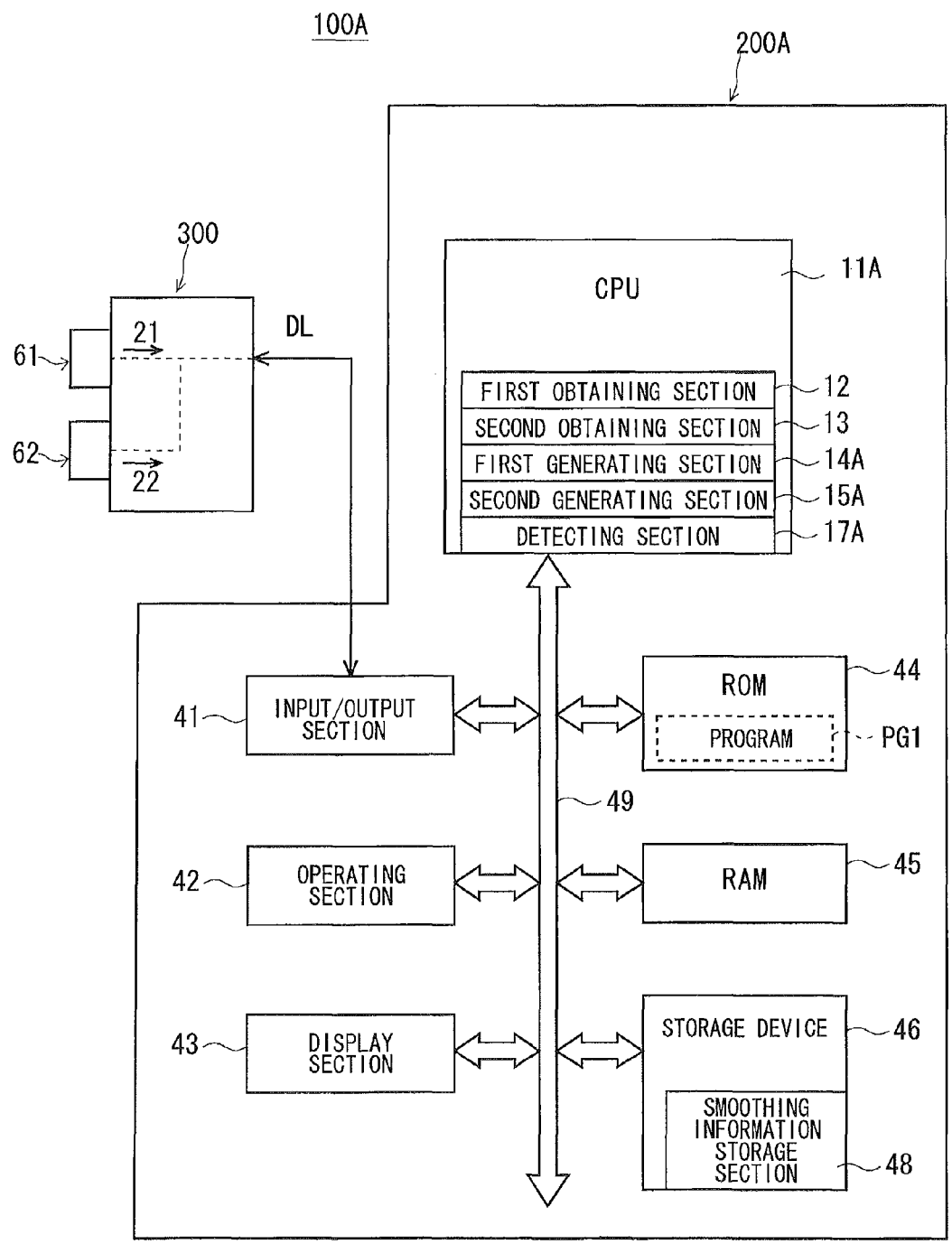
FIG. 1 is a diagram illustrating one example of a main constitution of an image processing system according to an embodiment.

FIG. 1 is a block diagram illustrating one example of a main constitution of the image processing system 100A according to an embodiment. As shown in FIG. 1, the processing system 100A is constituted so as to mainly include a stereo camera 300 and an image processing apparatus 200A. In the image processing system 100A, the image processing apparatus 200A obtains a base image 21 (FIG. 1 and FIG. 2) and a reference image 22 (FIG. 1 and FIG. 2) imaged by the stereo camera 300, and the image processing apparatus 200A processes the base image 21 and the reference image 22, so that a the pseudo image 24 (FIG. 2) corresponding to image-capturing of an object from a virtual viewpoint different from a first viewpoint from which the base image 21 is imaged, namely, the pseudo image 24 corresponding to an image of an object captured at a virtual viewpoint different from the first viewpoint is generated. The pseudo image 24 constitutes a stereoscopically viewable stereoscopic image in combination with the base image 21.

The Stereo Camera 300:

As shown in FIG. 1, the stereo camera 300 is mainly constituted by a base camera 61 and a reference camera 62. Further, the base camera 61 and the reference camera 62 mainly include an image-capturing optical system and a control processing circuit, not shown. Further, the base camera 61 and the reference camera 62 are arranged apart from each other by a predetermined base line length with respect to the vertical direction, and information about a light beam incident on the image-capturing optical system from the object is synchronized so as to be processed by the control processing circuit or the like. As a result, the base image 21 (FIG. 1 and FIG. 3) and the reference image 22 (FIG. 1 and FIG. 4), which are digital images with a predetermined size such as a pixel size of 3456×2592 constituting a stereo image of the object, are generated. Further, various operations of the stereo camera 300 are controlled based on control signals supplied from the image processing apparatus 200A via an input/output section 41 and a communication line DL. The communication line DL may be a wired line or a wireless line.

As long as positional relationships between the object and the stereo camera 300 at times of imaging the base image 21 and the reference image 22 are the same as each other, the base image 21 and the reference image 22 do not have to be imaged at the same time. Further, the stereo camera 300 continuously images an object sequentially over time while the base camera 61 and the reference camera 62 are synchronizing with each other so as to be capable of generating the plurality of base images 21 and the plurality of reference images 22. Further, the base image 21 and the reference image 22 may be a color image or a monochrome image.

The generated base image 21 and reference image 22 are supplied via the communication line DL to the input/output section 41 of the image processing apparatus 200A. The image processing apparatus 200A generates first pieces of distance information 27 (FIG. 2) as distance information about an object based on the base image 21 and the reference image 22, and generates the pseudo image 24 (FIG. 2) based on the base image 21 and second pieces of distance information 28 (FIG. 2) generated from the first pieces of distance information 27.

Constitution of the Image Processing Apparatus 200A:

As shown in FIG. 1, the image processing apparatus 200A is mainly constituted by a CPU 11A, the input/output section 41, an operation section 42, a display section 43, a ROM 44, a RAM 45 and a storage device 46, and is implemented by, for example, execution of a program in a general-purpose computer.

The input/output section 41 is constituted by an input/output interface such as an USB interface or a Bluetooth (trademark registration) interface, a multimedia drive, and an interface for connecting with LAN or the Internet such as a network adapter. The input/output section 41 transmits/receives data with the CPU 11A. Concretely, the input/output section 41 supplies, for example, various control signals used for the CPU 11A to control the stereo camera 300, to the stereo camera 300 connected with the input/output section 41 via the communication line DL and the like. Further, the input/output section 41 supplies the base image 21 and the reference image 22 imaged by the stereo camera 300 to the image processing apparatus 200A. The input/output section 41 supplies the base image 21 and the reference image 22 to the image processing apparatus 200A in a manner of accepting a storage medium such as an optical disc in which the base image 21 and the reference image 22 are stored in advance.

The operation section 42 is constituted by, for example, a keyboard or a mouse, and an operator operates the operation section 42 so as to set various control parameters in the image processing apparatus 200A, and various operation modes of the image processing apparatus 200A. Further, a function section of the image processing apparatus 200A is constituted so as to be capable of executing processes according to the various operation modes set by the operation section 42.

The display section 43 is constituted by a liquid crystal display screen for three-dimensional display that copes with a three-dimensional display system such as a parallax barrier system. Further, the display section 43 includes an image processing section, not shown, for converting a stereoscopic image including the base image 21 and the pseudo image 24 into an image format corresponding to the three-dimensional display system in the display section 43. The display section 43 displays the stereoscopic image subject to a necessary converting process by means of the image processing section on its display screen. When a three-dimensional display system where for example, a left-eye image and a right-eye image are alternately switched at a high speed so as to be displayed on the display section 43, and a stereoscopic image displayed on the display section 43 is observed via a pair of dedicated eyeglasses whose respective shutter sections corresponding to a left eye and a right eye can be alternately opened/closed in synchronization with the switching, is employed as the three-dimensional display system in the display section 43, usefulness of the present invention is not deteriorated. The display section 43 can display an image supplied from the stereo camera 300, an image generated by the image processing apparatus 200A, various setting information about the image processing apparatus 200A, and control GUI (Graphical User Interface) so that they can be visually recognized as two-dimensional images and character information by an observer.

The ROM (Read Only Memory) 44 is a read-only memory, and stores a program PG1 for operating the CPU 11A therein. A readable/writable nonvolatile memory (for example, a flash memory) may be used instead of the ROM 44.

The RAM (Random Access Memory) 45 is a readable/writable volatile memory, and functions as an image storage section for temporarily storing various images obtained by the image processing apparatus 200A, the pseudo image and distance information (distance image) generated by the image processing apparatus 200A therein, and a work memory for temporarily storing processed information of the CPU 11A therein.

Figure 2:
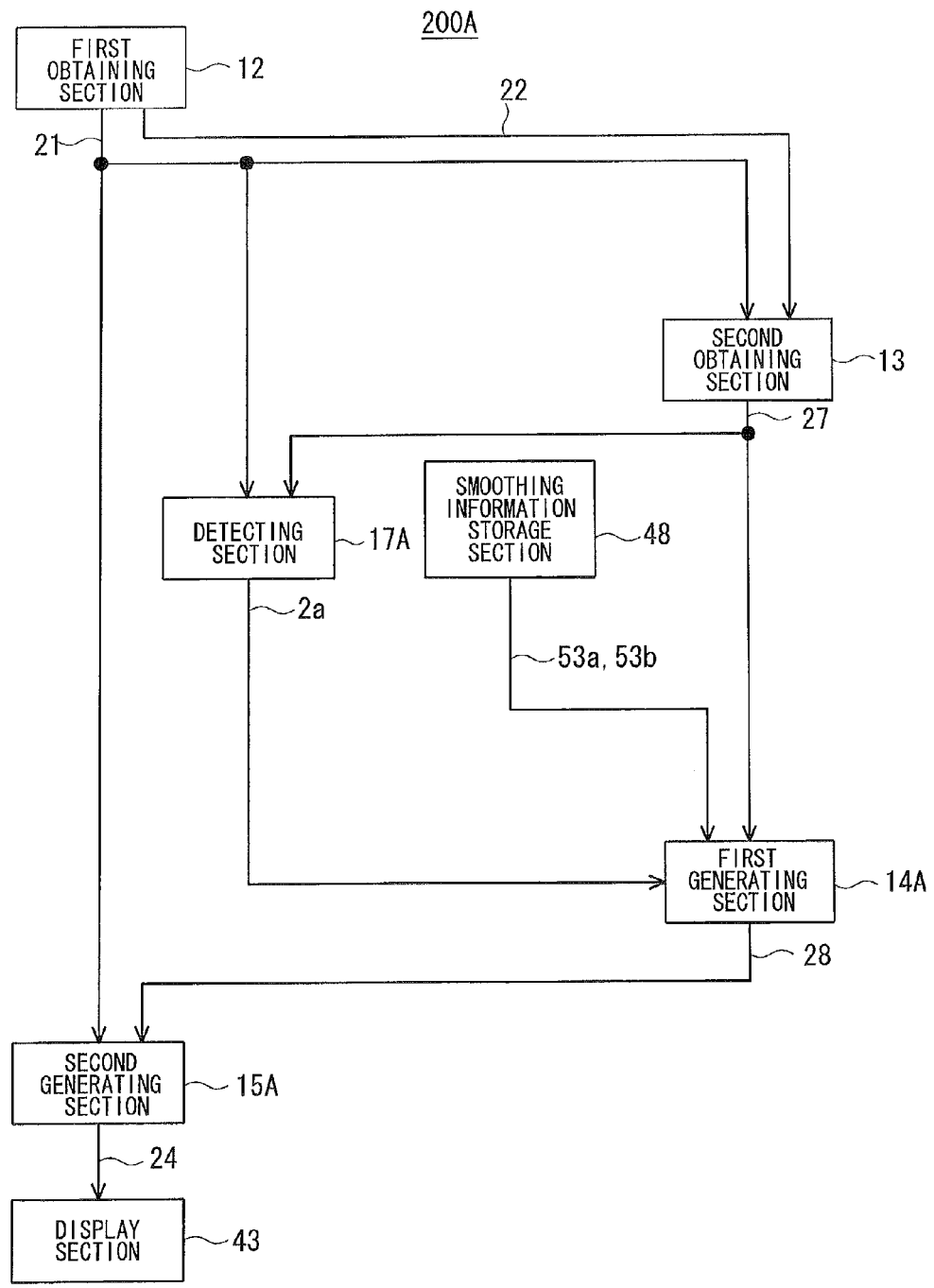
FIG. 2 is a diagram illustrating one example of a functional constitution of an image processing apparatus according to the embodiment.

The storage device 46 is constituted by a readable/writable nonvolatile memory such as a flash memory or a hard disc device, and permanently records information such as various control parameters and various operation modes of the image processing apparatus 200A. Further, a smoothing information storage section 48 is provided to the storage device 46, and various smoothing information for smoothing image information about an object and the like is stored in the smoothing information storage section 48. The smoothing information is, for example, information for defining a smoothing filter, namely, information for defining a type of the smoothing filter and defining smoothing strength, or various information about the smoothing process such as a program corresponding to the smoothing process, namely, a smoothing rule. The smoothing information is referred by a first generating section 14A (FIG. 2), and is provided for a process for obtaining the second pieces of distance information 28 (FIG. 2).

The CPU (Central Processing Unit) 11A is a control processing device for generally controlling the respective functions of the image processing apparatus 200A, and makes control and executes a process according to the program PG1 stored in the ROM 44. The CPU 11A, as described later, functions also as a first obtaining section 12, a second obtaining section 13, the first generating section 14A, the second generating section 15A, and the detecting section 17A.

By means of these function sections and the like, the CPU 11A generates, based on the base image 21 (FIG. 2 and FIG. 3) of the object captured from a first viewpoint, the pseudo image 24 (FIG. 2 and FIG. 18) of an object corresponding to image-capturing from a virtual viewpoint different from the first viewpoint, namely, the pseudo image 24 constituting a stereoscopically viewable stereoscopic image in combination with the base image 21. Further, the CPU 11A controls an image-capturing operation of the stereo camera 300, and also controls the display section 43, so that various images, calculated results, various control information, and the like, are displayed on the display section 43.

Further, the CPU 11A, the input/output section 41, the operation section 42, the display section 43, the ROM 44, the RAM 45, the storage device 46, and the like, are electrically connected to one another via a signal line 49. Therefore, the CPU 11A can, for example, control the stereo camera 300 and obtain image information from the stereo camera 300 via the input/output section 41, and also can make a display on the display section 43, at predetermined timings.

In a constitutional example shown in FIG. 1, the respective function sections including the first obtaining section 12, the second obtaining section 13, the first generating section 14A, a second generating section 15A, and a detecting section 17A are implemented by the CPU 11A executing a predetermined program. However, these function sections may be implemented by, for example, a dedicate hardware circuit or the like.

<Operation of the Respective Function Sections in the Image Processing Apparatus 200A:>

Figure 3:
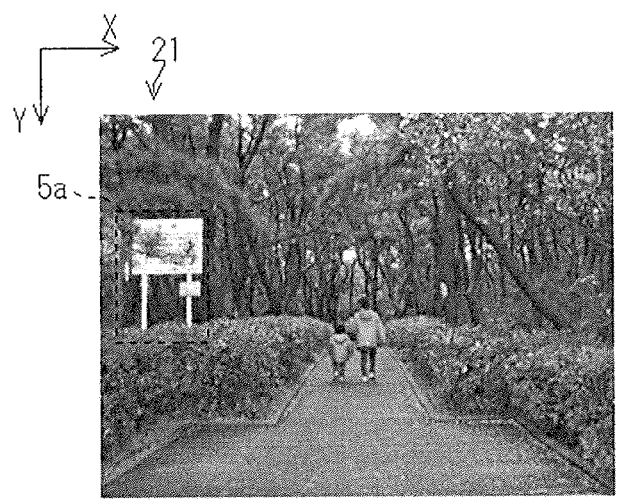
FIG. 3 is a diagram illustrating one example of a base image.
Figure 4:
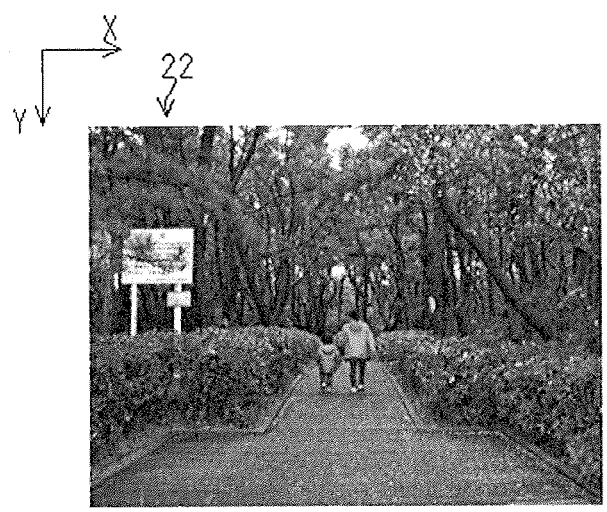
FIG. 4 is a diagram illustrating one example of a reference image.
Figure 26:
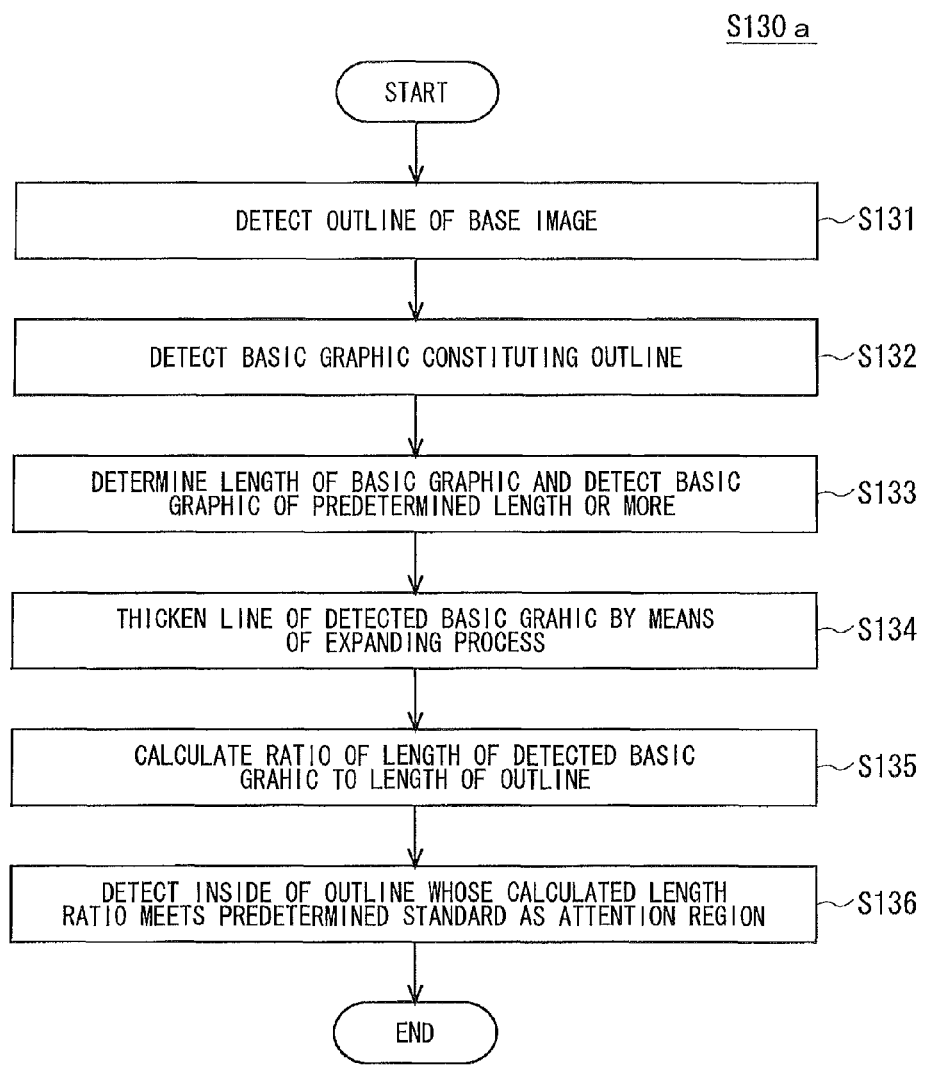
FIG. 26 is a diagram illustrating an operation flow of the image processing apparatus according to the embodiment.
Figure 27:
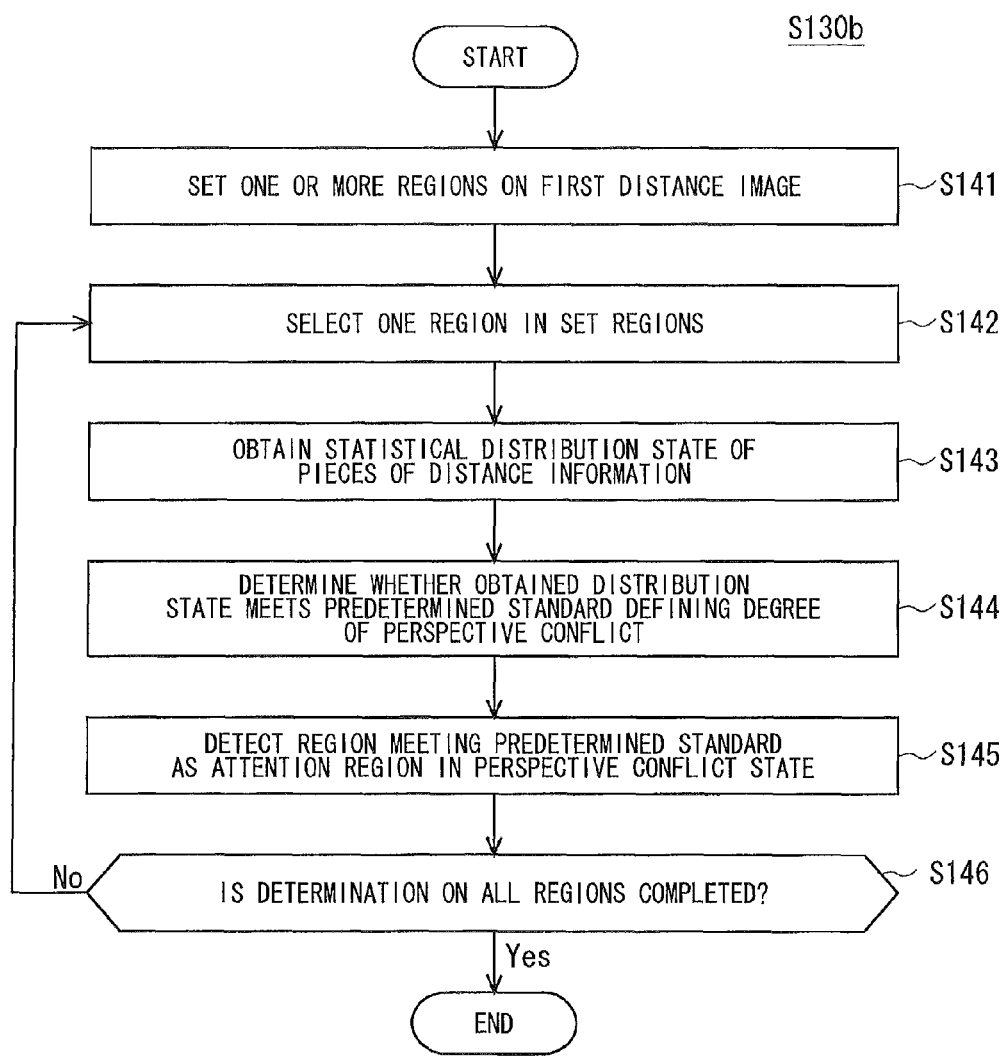
FIG. 27 is a diagram illustrating an operation flow of the image processing apparatus according to the embodiment.

FIG. 2 is a block diagram illustrating one example of a main functional constitution of the image processing system 200A according to the embodiment. FIG. 3 and FIG. 4 are diagrams illustrating examples of the base image 21 and the reference image 22 obtained by imaging an object using the base camera 61 and the reference camera 62 of the stereo camera 300 according to the embodiment. Further, FIGS. 25 to 27 are diagrams illustrating an operation flow of the image processing apparatus 200A according to the embodiment. The operations of the respective function sections in the image processing apparatus 200A are described below with suitable reference to an operation flow in FIGS. 25 to 27 by exemplifying a case where the image processing apparatus 200A generates, based on the base image 21 and the reference image 22, the pseudo image 24 (FIG. 18) corresponding to image-capturing of an object from a virtual viewpoint different from the first viewpoint from which the base image 21 is imaged, namely, the pseudo image 24 constituting a stereoscopically viewable stereoscopic image in combination with the base image 21.

Prior to the image-capturing of an object whose pseudo image corresponding to the image-capturing from the virtual viewpoint is subject to be generation, a position and a posture of the stereo camera 300 are adjusted so that the object can be imaged by both the base camera 61 and the reference camera 62. A position of the base camera 61 of the stereo camera 300 in this state is the first viewpoint. More concretely, for example, a principal point position of the image-capturing optical system of the base camera 61 is the first viewpoint. When a control signal for allowing the stereo camera 300 to perform the image-capturing operation is supplied from the CPU 11A to the stereo camera 300 in response to an operation performed by an operator and the like in a state where the position and the posture of the stereo camera 300 are adjusted, the image-capturing operation of the stereo camera 300 is performed. After the image-capturing operation is completed, the base image 21 and the reference image 22 of the object imaged by the base camera 61 and the reference camera 62 are generated so as to be supplied to the input/output section 41 of the image processing apparatus 200A.

The Operation of the First Obtaining Section 12:

After the base image 21 and the reference image 22 obtained by imaging the object at the first viewpoint are supplied to the input/output section 41, the first obtaining section 12 (FIG. 2) obtains the base image 21 via the input/output section 41 (step S110 in an operation flow S100A in FIG. 25), and also obtains the reference image 22.

FIG. 3 and FIG. 4 are diagrams illustrating examples of the base image 21 and the reference image 22. Since a direction of a base line length between the base camera 61 and the reference camera 62 is along a vertical direction (a Y-axial direction in FIG. 3 and FIG. 4), parallax, described later, occurs along the Y axial direction between the base image 21 and the reference image 22. Further, a vertical signboard is imaged on a region 5a of the base image 21. The vertical signboard is one example of an artificial material having a lot of basic graphic elements such as straight lines. Further, trees that are present nearer to the stereo camera 300 than the vertical signboard are imaged inside a region where the vertical signboard is imaged, and trees that are present farther from the stereo camera 300 than the vertical signboard are imaged on a region around the region where the vertical signboard is imaged. For this reason, a distribution state of each distance from the stereo camera 300 to each pixel of the region 5a is such that a distribution width is wide and is discrete. In FIG. 3 and FIG. 4, a coordinate axis is provided for making the description easy. Further, a coordinate axis is suitably provided also in other drawings of the present application, so as to be occasionally used for the description.

As shown in FIG. 2, the obtained base image 21 is supplied to the second obtaining section 13, the second generating section 15A, and the detecting section 17A. Further, the reference image 22 is supplied to the second obtaining section 13. The first obtaining section 12 may obtain via the input/output section 41 the base image 21 and the reference image 22 that are imaged and saved in a recording medium in advance.

Figure 7:
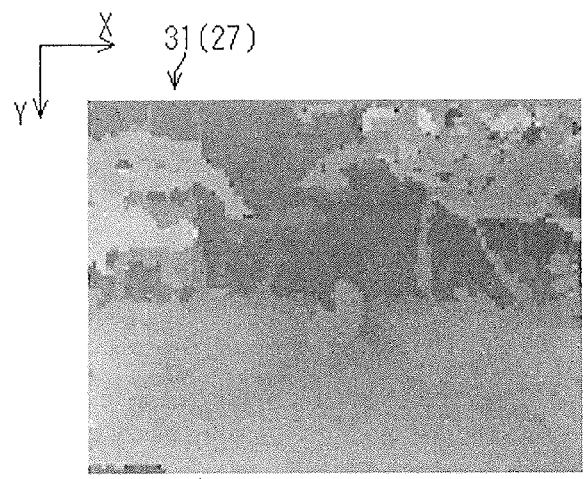
FIG. 7 is a diagram illustrating one example of an original distance image.

The Operation of the Second Obtaining Section 13:

FIG. 7 is a diagram illustrating one example of an original distance image 31 (the first pieces of distance information 27) obtained by the second obtaining section 13 (FIG. 2). After the base image 21 and the reference image 22 are supplied to the second obtaining section 13, the second obtaining section 13 executes a corresponding point searching process on the base image 21 and the reference image 22 using a correlation operating method, so as to identify each corresponding pixel of the reference image 22 corresponding to each attention pixel of the base image 21. With respect to an attention pixel and a corresponding pixel that correspond to each other, the second obtaining section 13 executes a process for obtaining a difference (in the present application, referred to also as "parallax") between a pixel coordinate of the attention pixel on an image coordinate system of the base image 21 and a pixel coordinate of the corresponding pixel on an image coordinate system of the reference image 22 on each attention pixel of the base image 21. This process is executed for each attention pixel of the base image 21.

As will be described later, parallax is an index value relating to a distance from the stereo camera 300 to a point on an object, and in the present application, the term "distance information" is used as a general term of parallax and distance. That is to say, the second obtaining section 13 obtains the first pieces of distance information 27 (FIG. 7) about points on an object corresponding to respective pixels of the base image 21 (step S120 in FIG. 25). Further, in the first pieces of distance information 27, each parallax constituting the first pieces of distance information 27 is related with the pixel coordinate of each corresponding pixel of the base image 21. For this reason, the first pieces of distance information 27 can be obtained as, for example, the original distance image 31 in which the pieces of the base distance information 27 are arranged according to a pixel arrangement of the base image 21. The first pieces of distance information 27 (an original distance image 31) obtained by the second obtaining section 13 are supplied to the detecting section 17A and the first generating section 14A. Further, the second obtaining section 13 relates each correlating value that is calculated in a corresponding point searching process on each of the first pieces of distance information 27 to each corresponding piece of the distance information so as to supply them to the detecting section 17A.

An NCC (Normalized Cross Correlation) method, an SAD (Sum of Absolute Difference) method or a POC (Phase Only Correlation) method, for example, is employed as the correlation operating method to be used in the corresponding point searching process for identifying a corresponding pixel of the reference image 22 corresponding to an attention pixel of the base image 21. Further, as an image coordinate system of an image, for example, a rectangular coordinate system, in which an upper left end of an image (for example, on the base image 21 in FIG. 3, a corner of the image that is an end of the image in −X direction and also an end of the image in −Y direction) is an origin, and a lateral direction (X-axial direction) and a vertical direction (Y-axial direction) of the image are axes of coordinates, is employed.

Figure 5:
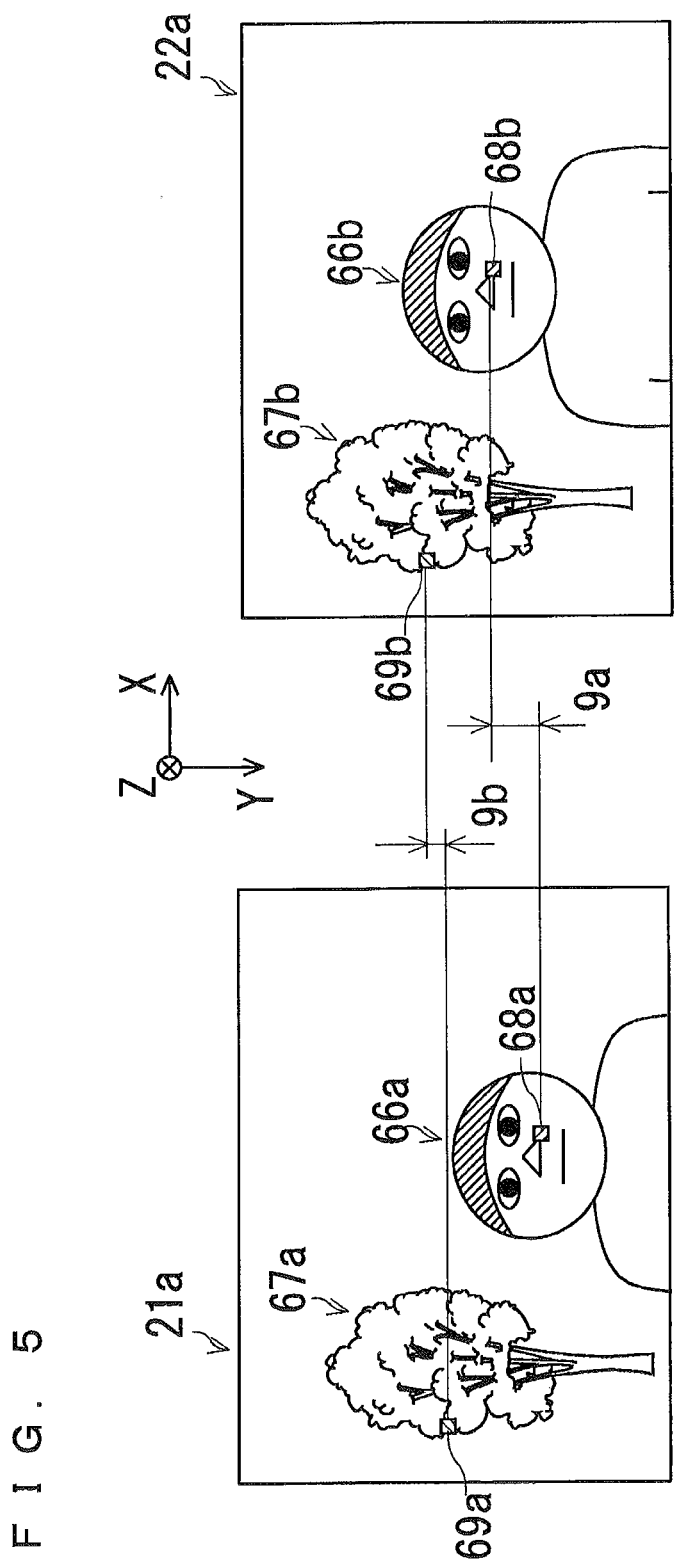
FIG. 5 is a diagram describing one example of parallax.

Example of Parallax:

FIG. 5 is a diagram for describing one example of a parallax between a base image 21a and a reference image 22a. The base image 21a is one example of the base image 21 (FIG. 2) of the object captured by the base camera 61, and the reference image 22a is one example of the reference image 22 (FIG. 2) of the object captured by the reference camera 62 arranged apart from the base camera 61 by a predetermined base line length in the vertical direction (+Y direction in FIG. 5). In FIG. 5, the base image 21a and the reference image 22a are arranged and displayed in a horizontal direction (X-axial direction in FIG. 5) so that Y coordinates of upper ends (lower ends) of both the images are equal to each other in order to easily understand the parallax.

In the base image 21a and the reference image 22a, foreground object images 66a and 66b of the same closer object positioned in a +Z direction relative to the stereo camera 300 are imaged, and background object images 67a and 67b of the same father object that is located father toward the +Z direction from the stereo camera 300 than the closer object are imaged. In FIG. 5, for easy description, only an edge (outline) of each characteristic portion of each of the object images is displayed. Further, a pixel 68a on the foreground object image 66a and a pixel 68b on the foreground object image 66b are pixels corresponding to the same point of the closer object, and a pixel 69a on the background object image 67a and a pixel 69a on the background object image 67b are pixels corresponding to the same point of the farther object. Further, a parallax 9a is a parallax between the pixel 68a and the pixel 68b, and a parallax 9b is a parallax between the pixel 69a and the pixel 69b. The parallax 9a and the parallax 9b have different values due to a difference in the distances of the closer object and the farther object relative to the stereo camera 300. More specifically, the parallax 9a related to the closer object is larger than the parallax 9b related to the farther object. Thus the magnitude of the parallax fluctuates according to the distance from the stereo camera 300 to the point on the object corresponding to the pixel on the image.

Positions of the principal points of the base camera 61 and the reference camera 62 are flush with an xy plane in a parallel manner, and their focal distances are equal to each other. Optical axes of the base camera 61 and the reference camera 62 are parallel with each other along a Z axis, and image pickup devices of the base camera 61 and the reference camera 62 are flush with each other and vertical to the optical axes, and scanning lines are parallel with each other between the image pickup devices. In an actual constitution, normally, constitution conditions of the base camera 61 and the reference camera 62 have errors relative to the above-described constitution conditions, but the image processing apparatus 200A executes a process using camera parameters such as positions of the principal points and focal distance information stored in the storage device 46 (referred to also as "parallelizing process") on the base image 21a and the reference image 22a so that the respective function elements of the stereo camera 300 can be realized in the same manner as in the case where the above constitution conditions are fulfilled.

When the parallelizing process is executed on the base image 21a and the reference image 22a, a distance D in the Z-axial direction between the principal point of the base camera 61 and an object point of the object corresponding to one pixel on the base image 21a is given by the formula (1) using a parallax d between the pixel and other pixel on the reference image 22a corresponding to the pixel, a focal distance fr (more accurately, the distance between the principal point and the image pickup device) between the base camera 61 and the reference camera 62, and a base line length b between the base camera 61 and the reference camera 62.

[Mathematical Formula 1]

$$D = \frac{fr \times b}{d} \quad (1)$$

As expressed in the formula (1), the parallax is an index value relating to a distance from the stereo camera 300 to a point on an object.

Basic Method for Generating Pseudo Image Based on the Distance Information:

Next, a description will be given to a method for generating the pseudo image 24 constituting a stereoscopic image in combination with the base image 21 based on pieces of distance information, such as each parallax corresponding to each pixel of the base image 21, each distance, and the like. When the base image 21 and the pseudo image 24 constituting a stereoscopic image are arranged in one image space so as to be stereoscopically viewable, directions of displacements, in the image space, of an attention pixel of the base image 21 and a corresponding pixel of the pseudo image 24 corresponding to the same point on the subject, namely, directions of parallaxes are the same as each other. In the present application, the same direction is called also "first direction". Even when a plurality of pseudo images constituting a stereoscopic image in combination with the base image 21 are generated, and two of the plurality of pseudo images are arranged so as to be stereoscopically viewable, a direction between pixels corresponding to the same point on an object between the two pseudo images is the first direction.

Figure 6:
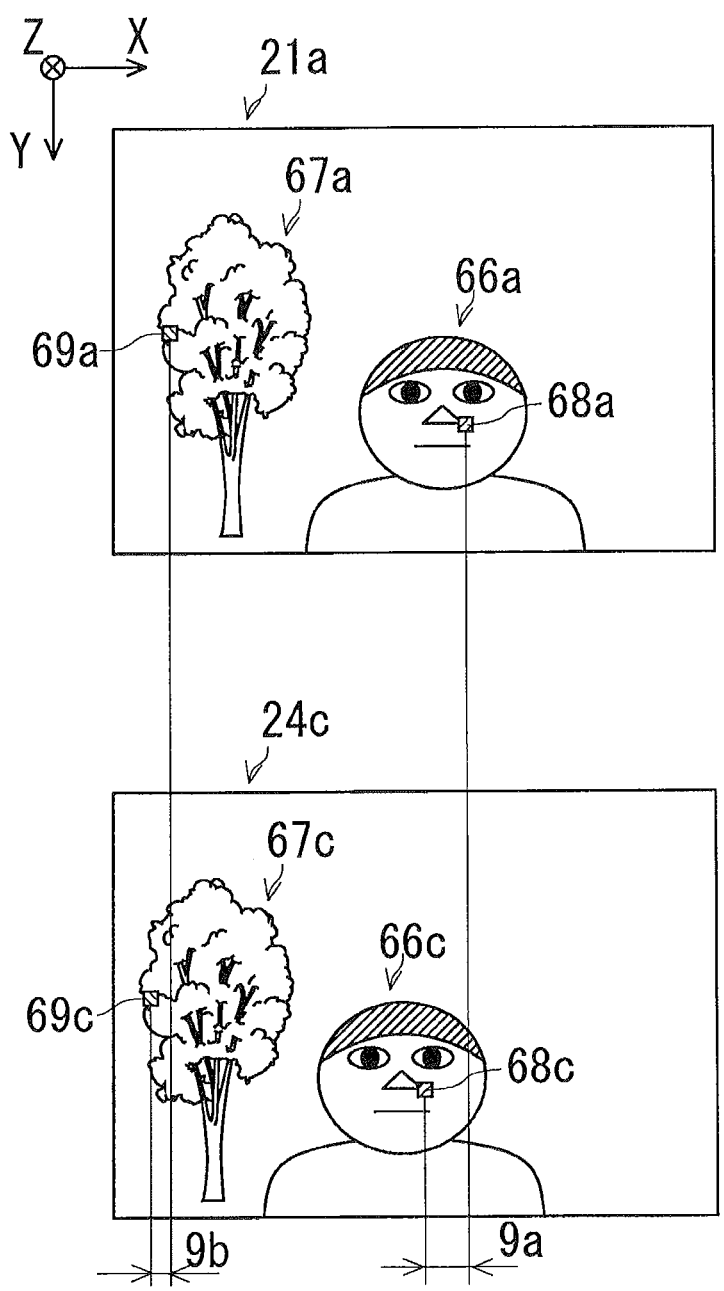
FIG. 6 is diagram describing one example of a basic method for generating a pseudo image from the base image.

FIG. 6 is a diagram for describing one example of the basic method for generating the pseudo image 24c constituting a stereoscopic image in combination with the base image 21a based on each parallax of the base image 21a and the reference image 22a shown in FIG. 5 and the base image 21a. The pseudo image 24c is one example of the pseudo image 24 (FIG. 2) corresponding to the image-capturing of the object from a virtual viewpoint different from the first viewpoint from which the base image 21a is imaged. The base image 21a and the pseudo image 24c are each displayed on an image display section of the display section 43 in a predetermined stereoscopically viewable mode so as to constitute a stereoscopic image.

A virtual viewpoint corresponding to the pseudo image 24c in FIG. 6 is located at a position apart from the first viewpoint from which the base image 21a is imaged, by the base line length between the base camera 61 and the reference camera 62 toward the +X direction along the X-axis. Therefore, the above-described first direction is the X-axial direction on the base image 21a and the pseudo image 24c.

Further, a foreground object image 66c and a background object image 67c on the pseudo image 24c correspond to the foreground object image 66a and the background object image 67a on the base image 21a, respectively. Further, the pixel 68a on the foreground object image 66a corresponds to a pixel 68c on the foreground object image 66c, and the pixel 69a on the background object image 67a corresponds to a pixel 69c on the background object image 67c. Also in FIG. 6, similarly to FIG. 5, only an edge (outline) of each characteristic portion in each of the object images is displayed in order to make the description easy, and the base image 21a and the pseudo image 24c are displayed in a vertical direction (a Y-axial direction in FIG. 6) so that X coordinates of left ends (right ends) are equal to each other in order to make understanding of parallax easy.

In this case, parallax 9a between the pixel 68a and the pixel 68b in FIG. 5 is set as the parallax between the pixel 68a of the base image 21a and the pixel 68c of the pseudo image 24c, and parallax 9b between the pixel 69a and the pixel 69b in FIG. 5 is set as the parallax between the pixel 69a on the base image 21a and the pixel 69c on the pseudo image 24c. As shown in FIG. 6, the parallaxes 9a and 9b between the base image 21a and the pseudo image 24c are caused in the first direction, namely, in the X-axial direction. Further, as for the other pixels of the pseudo image 24c, the parallax relative to the corresponding pixel in the base image 21a is set similarly, so that the parallax between each pixel of the pseudo image 24c and the corresponding pixel of the base image 21a is obtained. The base image 21a is transformed based on the obtained parallaxes, so that the pseudo image 24c is obtained.

Figure 28:
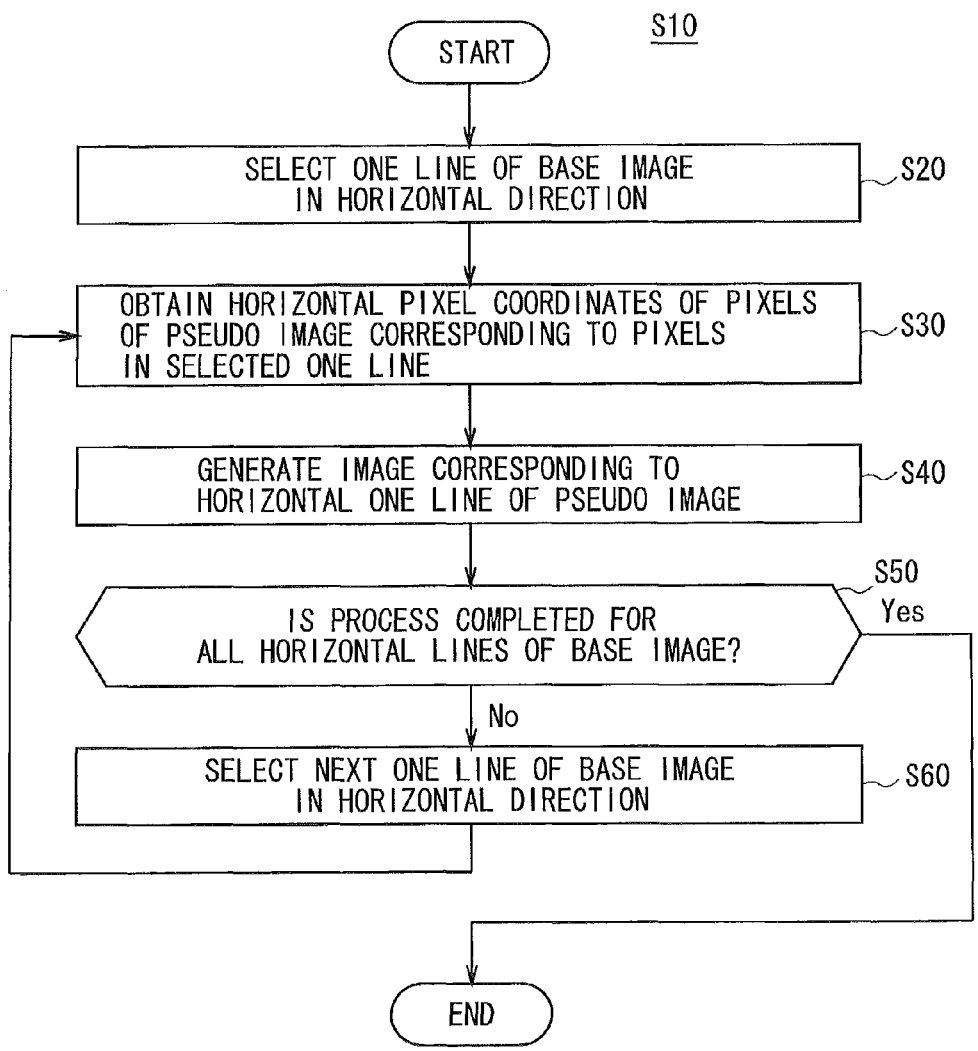
FIG. 28 is a diagram illustrating an operation flow of a basic method for generating a pseudo image.

The above-described basic method for generating a pseudo image based on a base image and a parallax is described in detail below. FIG. 28 is a diagram illustrating an operation flow S10 of the above-described basic method in the case where the pseudo image 24c (FIG. 6) is generated based on the base image 21a (FIG. 6) and the distance information about each pixel of the base image 21a.

When the process of the operation flow S10 in FIG. 28 is started, at the upper end of the base image 21a (FIG. 6) (an end in the −Y direction), a partial image 23a (FIG. 23) for one line in the first direction, namely, a horizontal scanning direction (the X-axial direction) is selected (step S20).

Figures 23, 24:
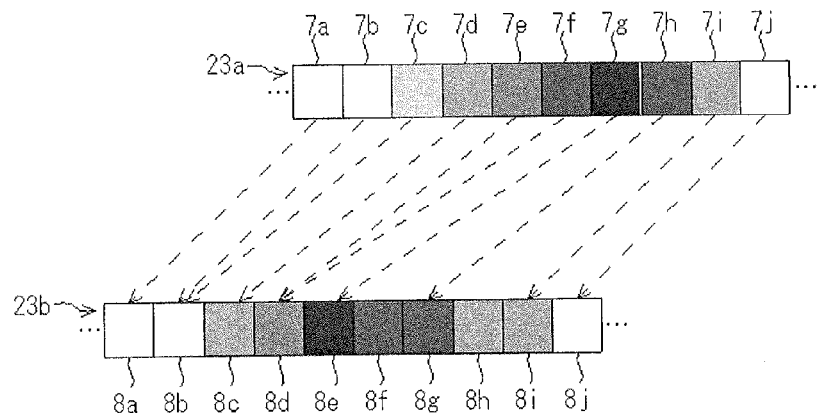
FIG. 23 is a diagram illustrating one example of correspondence of each pixel on a partial image of the base image and a partial image of the pseudo image.
FIG. 24 is a diagram illustrating one example of correspondence between a pixel coordinate of the base image, the distance information and a pixel coordinate of the pseudo image.

FIG. 23 is a diagram illustrating one example of correspondence relationship between pixels 7a to 7j of a part of the partial image 23a (FIG. 23) corresponding to one line of the upper end (the end in the −Y direction) of the base image 21a (FIG. 6) in the horizontal scanning direction (the X-axial direction) and pixels 8a to 8j of a part of a partial image 23b (FIG. 23) corresponding to one line of the upper end (the end in the −Y direction) of the pseudo image 24c (FIG. 6) corresponding to the base image 21a in the horizontal scanning direction. Further, the partial image 23a and the partial image 23b correspond to the same portion of the object. In order to make the understanding of the correspondence relationship easier, the pixels 7a to 7j and the pixels 8a to 8j are displayed so as to be segmented according to the degree of shading that varies depending on a pixel value.

FIG. 24 is a diagram illustrating one example of correspondence of pixel coordinates of each of the pixels 7a to 7j of the partial image 23a (FIG. 23) and parallax (distance information) thereof and of pixel coordinates of each of the pixels 8a to 8j of the partial image 23b (FIG. 23). In the first row and fifth row of FIG. 24, pixel numbers identifying the pixels 7a to 7j of the partial image 23a, and pixel numbers identifying the pixels 8a to 8j of the partial image 23b are shown. Further, in the second row of FIG. 24, X coordinate of each of the pixels 7a to 7j is shown in association with each of the pixel numbers shown in the first row. Further, in the third row of FIG. 24, among the parallaxes (distance information) calculated with respect to the base image 21a and the reference image 22a (FIG. 5), a parallax corresponding to each of the pixels 7a to 7j is shown in association with each of the pixel numbers shown in the first row.

After the partial image 23a corresponding to one line is selected in step S20 of FIG. 28, pixel coordinates (X coordinates) in the horizontal scanning direction (the X-axial direction) of the pixels of the pseudo image 24c corresponding to the pixels of the selected partial image 23a, namely, the pixels 8a to 8j of the partial image 23b are obtained (step S30 in FIG. 28).

Here, the above-described basic method is a method in a case where the virtual viewpoint corresponding to the pseudo image 24c (FIG. 6) exists in a position apart from the first viewpoint from which the base image 21a (FIG. 5, FIG. 6) has been captured by the base line length between the base camera 61 and the reference camera 62 toward the +X direction along the X-axis. Therefore, pixel coordinates (Y coordinates) of the pixels of the partial image 23a and the partial image 23b with respect to the vertical direction (Y-axial direction) are the same as each other. Further, the parallaxes shown in the third row of FIG. 24 are also the parallaxes between the partial image 23a and the partial image 23b.

Therefore, the X coordinate of each pixel of the partial image 23b is calculated by the formula (2). In the fourth row of FIG. 24, the X coordinate of each of the pixels 8a to 8j calculated by the formula (2) is shown in association with each of the pixel numbers shown in the fifth row.

[Mathematical Formula 2]

$$Xb = Xa - d \qquad (2)$$

where:
Xa: the X coordinate of pixel of the partial image belonging to the base image:
Xb: the X coordinate of pixel of the partial image belonging to the pseudo image:
d: parallax:

After the horizontal pixel coordinates of the pixels of the partial image 23b corresponding to one line of the pseudo image 24c are obtained, then pixel values of the pixels of the partial image 23b are obtained. That is to say, an image of the partial image 23b corresponding to one line is generated (step S40 in FIG. 28). A process in step S40 is described below by exemplifying the pixels 7a to 7j of the partial image 23a and the pixels 8a to 8j of the partial image 23b shown in FIG. 23.

According to the X coordinates of the pixels 8a to 8j shown in the fourth row of FIG. 24, the pixels 7a, 7b, 7c, 7d, 7e, 7f, 7g, 7h, 7i and 7j of the partial image 23a correspond to the pixels 8a, 8b, 8b, 8c, 8d, 8d, 8e, 8g, 8i and 8j of the partial image 23b, respectively. That is to say, in the pixels 8a to 8j, there are three kinds of pixels, a first kind of pixel corresponding to one of the pixels 7a to 7j, a second kind of pixel corresponding to two pixels of the pixels 7a to 7j, and a third kind of pixel corresponding to none of the pixels 7a to 7j.

In the process in step S40 of FIG. 28, the pixel value of the pixel of the partial image 23a corresponding to the first kind of pixel is adopted as the pixel value of the first kind of pixel. Further, a representative value of the pixel values of the two pixels of the partial image 23a, such as an average value, corresponding to the second kind of the pixel is adopted as the pixel value of the second kind of pixel. Further, as the pixel value of a third type pixel, for example, the pixel value of the pixel which is spatially the closest to the third kind of pixel among the pixels of the partial image 23b whose pixel values are obtained based on the correspondence relationship with the partial image 23a is adopted. An image of the partial image 23b is specified by the pixel coordinates (X coordinates) and the pixel values specified for the pixels of the partial image 23b.

After the process in step S40 is completed, a check is made whether or not the process (steps S30 to S40) for generating the partial image of the corresponding pseudo image is completed with respect to all the lines of the base image 21a in the horizontal direction (the X-axial direction) (step S50 in FIG. 28). As a result of the check in step S50, when the process is not completed with respect to all the lines in the horizontal direction, the line of the base image 21 next to the processed line in the +Y direction is selected as a new subject to be processed (step S60 in FIG. 28), and the process is returned to step S30. Further, as a result of the check in step S50, when the process for generating the partial image of the pseudo image is completed with respect to all the lines in the horizontal direction, the process for generating the pseudo image 24c is completed.

The transformation of the base image 21 (FIG. 2) based on the parallaxes may be performed on a pixel-size basis as a minimum unit. Therefore, when the parallax is obtained on a pixel-size basis, the pseudo image 24 (FIG. 2) can be obtained, but for example, even when the correspondence point search for obtaining the parallax is carried out on a sub-pixel basis that is not more than the pixel size so that the parallax is obtained on a sub-pixel basis, the pseudo image 24 can be obtained if the transformation of the base image 21 based on the parallax is on a pixel basis. For this reason, usability of the present invention is not deteriorated.

The method for obtaining a pseudo image in the case where a base line length between the virtual viewpoint and the first viewpoint relating to the imaging of the base image 21 is different from the base line length between the base camera 61 and the reference camera 62 corresponding to the base image 21 and the reference image 22, respectively, is described below. In this case, for example, distances of respective points of the object corresponding to the respective points of the base image 21 are calculated based on the parallaxes of the points of the base image 21 using the formula (1), and the parallaxes between the pixels of the base image 21 and the pixels of the pseudo image 24 are obtained according to the formula (1) based on the calculated distances, and the base line length between the virtual viewpoint and the first viewpoint. The base image 21 is transformed based on the obtained parallaxes so that the pseudo images 24 corresponding to the different base line length can be obtained.

Therefore, even when a three-dimensional measuring machine of an active ranging system, that includes for example, the base camera 61 and a light projecting device for projecting various detection light beams for measuring shapes of laser beams onto an object instead of the stereo camera 300 and obtains the base image 21 of an object and distance information about the points of the object corresponding to the pixels of the base image 21 according to a principle of triangulation or a TOF (Time of Flight) system, is adopted, the parallax of the pseudo image 24 with respect to the base image 21 can be obtained by the distance information and the formula (1), and the pseudo image 24 can be obtained based on the parallax and the base image 21. For this reason, the usability of the present invention is not deteriorated.

Further, normally, chroma of an image obtained by imaging an object is higher as the object is closer, and the chroma is lower as the object is farther. For this reason, even when the three-dimensional measuring machine for obtaining the base image 21 by the base camera 61 and obtaining distance information corresponding to the pixels of the base image 21 based on the chroma of the base image 21 is adopted instead of the stereo camera 300, the usability of the present invention is not deteriorated. Further, even when a method for estimating and obtaining the distance information corresponding to the pixels of the base image 21 based on an assumption such that, for example, as the Y coordinates of the pixels of the base image 21 (FIG. 3) increase more, the points on the object corresponding to the pixels are closer to the base camera 61 is adopted, the usability of the present invention is not deteriorated.

Even when the three-dimensional measuring machine for measuring the distance information about the object based on an image imaged from a viewpoint different from the viewpoint relating to the imaging of the base image 21, and the base camera 61 are adopted instead of the stereo camera 300, the base image 21 and the measured distance information can be related to each other via the corresponding point searching process on the image relating to the different viewpoint and the base image 21. For this reason, the usability of the present invention is not deteriorated.

Necessity of the Smoothing Process:

Meanwhile, in the stereo camera 300, normally, an error occurs in correspondence for identifying the pixels on the reference image 22 corresponding to the pixels on the base image 21. Further, also in the three-dimensional measuring machine of the active ranging system, an error is caused in positional information or time information about intersection between a camera sight line of the base camera 61 and detection light projected onto the object. For this reason, each of the first distance information 27 (an original distance image 31) illustrated in FIG. 7 normally includes various measurement errors such as random noise-type measurement dispersion.

When the pseudo image is generated directly based on the first pieces of distance information 27 by the above-described basic method, the pseudo image to be generated particularly includes a noise component in such a manner that an image of a straight line on the base image 21 is reproduced on the pseudo image as, for example, an image obtained by superimposing a serrated uneven component on the straight line due to the measurement error.

Therefore, for example, a process for firstly reducing dispersion of the first pieces of distance information 27 and secondly generating a pseudo image based on the first pieces of distance information 27 whose dispersion is reduced according to the basic method is required in order to remove the noise component instead of the process for directly processing the first pieces of distance information 27 using the basic method and generating a pseudo image.

General Smoothing Process for Reducing Dispersion of Distance Information:

Next, a general smoothing process for reducing dispersion of distance information is described below. As the smoothing process on image data such as the original distance image 31, generally the smoothing process that adopts various smoothing filters such as an averaging filter, a median filter, and a Gaussian filter is executed, for example. In the smoothing process, the smoothing filter whose smoothing strength (called also "smoothing Strength") is constant with respect to pixels on an image to be smoothed is applied. The smoothing strength of the smoothing filter can be changed by, for example, changing a size of the filter.

Figure 8:
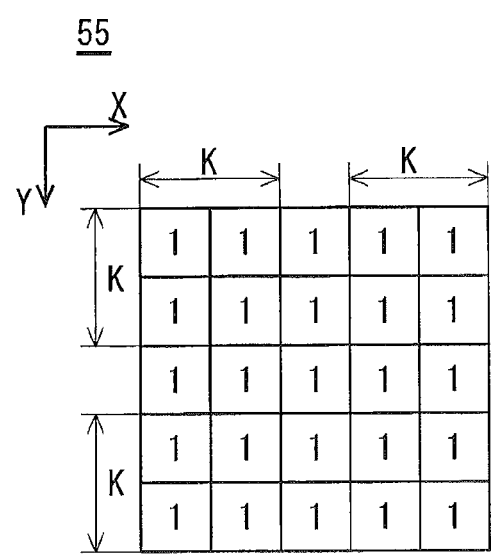
FIG. 8 is a diagram illustrating one example of an averaging filter.

FIG. 8 is a diagram illustrating one example of an averaging filter 55. For convenience of illustration, FIG. 8 illustrates the averaging filter 55 in which a value of each of matrix elements is 1 and a size is 5×5 pixels (5 rows, 5 columns). In the averaging filter 55, the filter size, namely, the smoothing strength fluctuates according to a value of a parameter K for defining the number of pixels in the X direction and the Y direction, respectively. Averaging filters 56a to 56c (FIG. 19 to FIG. 21), described later, are displayed with a size different from the actual size, and a parameter similar to the parameter K for defining the number of pixels of each filter is set.

When the averaging filter 55 is applied to image data subject to the smoothing process, the averaging filter 55 is overlapped with a region which mainly includes attention pixels in an image space of the image data to be smoothed and whose size is the same as the averaging filter 55. A product-sum operation is performed on the pixel value of each pixel in the region and a value of each of the matrix elements of the averaging filter 55 corresponding to each pixel, and a process for replacing a value obtained by dividing the operated result by the number of pixels to be subject to the product-sum operation with a pixel value of the attention pixel is executed. Much the same is true on the averaging filters 56a to 56c described later.

Figure 9:
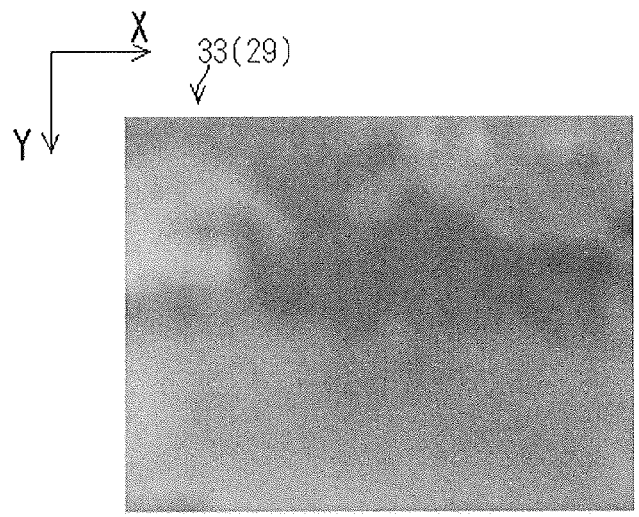
FIG. 9 is a diagram illustrating one example of a distance image smoothed with same smoothing strength.

FIG. 9 is a diagram illustrating a distance image 33 obtained by smoothing the original distance image 31 as a result of applying each of the averaging filters 55 having the smoothing function with the same strength defined by the parameter K of a value 94 to the pixels of the original distance image 31 shown in FIG. 7 (pieces of distance information 29 obtained by smoothing the first pieces of distance information 27). The value 94 of the parameter K is calculated with the number of pixels U, the number of pixels V and a parameter L in a formula (3) being 3456 pixels, 2592 pixels, and 64, respectively.

[Mathematical Formula 3]

$$K = \text{ROUND}\left(\frac{U+V}{L}\right) \quad (3)$$

ROUND ( ): Round-Off Function

Figure 10:
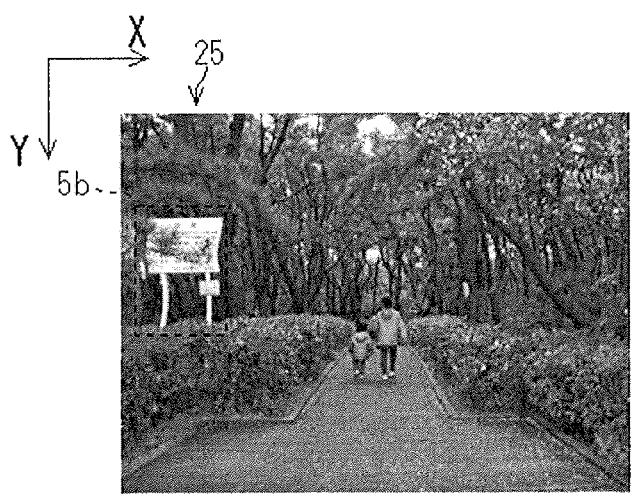
FIG. 10 is a diagram illustrating one example of pseudo image whose distortion is not suppressed.

Distortion Caused in Simulated Image and Reason for Causing:

Further, FIG. 10 is a diagram illustrating a pseudo image 25 generated by applying the basic method for generating a pseudo image to a distance image 33 (the pieces of distance information 29) shown in FIG. 9. An image on the region 5a of the base image 21 in FIG. 3, namely, an image corresponding to an image of an artificial material (vertical signboard) having a lot of basic graphical elements such as straight lines is generated on a region 5b of the pseudo image 25.

As shown on the region 5b, a serrated uneven component is not superimposed on a portion of the image on the region 5b corresponding to an outer edge of the vertical signboard having a straight line shape on the region 5a (FIG. 3), but this portion is curved into a convex shape in the −X direction. That is to say, shape distortion occurs in the image of the vertical signboard.

Here, different information about distances between a vertical signboard imaged on the region 5a and trees present on front and rear sides of the vertical signboard with respect to the stereo camera 300 coexists on a region of the original distance image 31 (FIG. 7) corresponding to the region 5a of the base image 21 (FIG. 3), and a state of a statistical distribution of the distance information on the corresponding region is such that the distribution is wide and discrete.

For this reason, due to the smoothing process on the original distance image 31 using the averaging filter 55 defined by the parameter K of the value 94, namely, the uniform smoothing process on the original distance image 31, the distance information gently fluctuates also on a portion along any of the Y-axial direction (FIG. 9), namely, a direction crossing the first direction (the X-axial direction) and the first direction on a portion of the distance image 33 (FIG. 9) corresponding to the vertical signboard on the region 5a (FIG. 3). In the present application, the direction crossing the first direction is called also "second direction".

The process for generating a pseudo image constituting a stereoscopic image in combination with the base image is generally executed by a process for spatially shifting each portion of the base image along the first direction or a process similar to the shifting process like the basic method for generating a pseudo image described with reference to FIG. 23, FIG. 24, and the formula (2).

Therefore, when the fluctuation (dispersion) in the first pieces of distance information 27 on the original distance image 31 occurs only along, for example, the first direction (the X-axial direction) of the distance image 33, a fluctuation direction of pieces of distance information and the shifting direction match with each other. For this reason, the fluctuation (dispersion) of the distance information along the first direction causes only expansion and contraction of each portion on the pseudo image along the first direction (the X-axial direction). That is to say, the pseudo image to be generated only moves in parallel and expands along the X-axial direction without being curved into a convex shape to the −X direction, for example. For this reason, an observer feels less discomfort about the pseudo image.

On the other hand, when the fluctuation direction (dispersion direction) of the first pieces of distance information 27 on the original distance image 31 is along the second direction, the fluctuation direction of the pieces of distance information is different from the shifting direction. For this reason, the fluctuation (dispersion) of the distance information causes shape distortion on the pseudo image. Further, the observer might feel discomfort about the pseudo image.

For example, when the pieces of distance information on the distance image 33 in the Y-axial direction, namely, the portion in the second direction fluctuates, an X coordinate of each pixel on the portion of a pseudo image to be generated corresponding to the pieces of distance information fluctuates according to the fluctuation. Distortion curved into a convex shape to the −X direction on the region 5b of the pseudo image 25 (FIG. 10) is caused by a component along the Y-axial direction (the second direction) in the fluctuation in the pieces of distance information generated on a portion of the distance image 33 (FIG. 9) corresponding to the region 5a (FIG. 3).

Countermeasure Against Distortion of Simulated Image:

As described above, an influence exerted on the shape distortion of the pseudo image by the fluctuation in the first pieces of distance information 27 on the original distance image 31 has anisotropy. A main cause of the shape distortion on the pseudo image to be finally shape distortion on a stereoscopic image is that the fluctuation direction (dispersion direction) of the first pieces of distance information 27 on the original distance image 31 is along the second direction.

Therefore, suppression (reduction) of the fluctuation (dispersion) in the first pieces of distance information 27 on the original distance image 31 in the second direction plays a key role in suppression of the shape distortion on the pseudo image, and a role played by the reduction in the dispersion of the pieces of distance information in the first direction is relatively small.

Therefore, in the image processing apparatus 200A, an attention is paid to that the influence of the fluctuation (dispersion) in the first pieces of distance information 27 on the original distance image 31 is anisotropic, and a countermeasure of the present invention for repressing the distortion on the pseudo image is taken.

Concretely, the image processing apparatus 200A executes the reducing process for reducing the dispersion of e the first pieces of distance information 27 so that strength for reducing the dispersion of the first pieces of distance information 27 in the second direction (the Y-axial direction) crossing the first direction (the X-axial direction) is stronger than strength for reducing the dispersion of the first pieces of distance information 27 of the original distance image 31 in the first direction, thereby generating the second pieces of distance information 28.

As a result of the countermeasure, in the second pieces of distance information 28 generated by the image processing apparatus 200A, dispersion of the pieces of distance information about the second direction crossing the first direction, namely, dispersion of the pieces of distance information in the second direction that is a main cause of the shape distortion on the pseudo image is smaller than the dispersion of the pieces of distance information in the first direction. Since the pseudo image 24 is generated based on the second pieces of distance information 28 to be generated, the distortion such as a curve of an image generated on the pseudo image 24 can be reduced. That is to say, with the above countermeasure, the image processing apparatus 200A can reduce the distortion on an image generated on the pseudo image.

Operations of the detecting section 17A, the first generating section 14A, and the second generating section 15A relating to the process for repressing distortion on a pseudo image in a process where the image processing apparatus 200A generates the pseudo image 24 (FIG. 18) whose distortion is repressed based on the base image 21 are described below.

Operation of the Detecting Section 17A:

The detecting section 17A (FIG. 2) categorizes an image space corresponding to the second pieces of distance information 28 (a derived distance image 32) (FIG. 2, FIG. 17) used for generating the pseudo image 24 whose distortion is suppressed, namely, an image space corresponding to the base image 21 and the original distance image 31 into a region of the pseudo image 24 where image distortion is likely to occur ("an attention region") and a non-attention region of the pseudo image 24 where image distortion is less likely to be caused than the attention region based on a predetermined determination condition so as to detect the regions. That is to say, the detecting section 17A detects the attention region of the pseudo image 24 in the image space corresponding to the original distance image 31 (FIG. 2) where image distortion is likely to occur based on a predetermined determination condition (step S130 in FIG. 25). In the present application, the pieces of distance information that the second pieces of distance information 28 is arranged according to the pixel arrangement of the base image 21 is called also "derived distance image", and the second pieces of distance information 28 is derived from the first pieces of distance information 27 by the process for reducing dispersion of the first pieces of distance information 27.

Process for Detecting Attention Region Based on Basic Graphic Region:

FIG. 26 is a diagram describing an operation flow S130a in which the detecting section 17A detects a basic graphic region, described later, as the attention region. When a process in step S130 (FIG. 25) is started, and an operation mode for detecting a basic graphic region as the attention region is set, the operation flow S130a in FIG. 26 is started. The detecting section 17A executes an image process using, for example, Canny algorithm so as to detect an outline (edge) present on the base image 21 (FIG. 3) (step S131). Further, as the outline detecting method, an image process using a differential filter such as a Sobel filter can be adopted.

When each outline present on the base image 21 is detected, the detecting section 17A carries out Hough transformation on each outline so as to detect each basic graphic constituting each outline (step S132). Here, in the present application, a graphic whose shape and size are specified in a coordinate space by giving concrete numerical values to parameters of a predetermined formula, such as a straight line, a curve of second order, an arc, an elliptic arc, and a texture as a pattern where a predetermined design is repeated, is called also "basic graphic". The detecting section 17A executes the process for detecting at least one basic graphic of these basic graphics based on the detected outline.

When each basic graphic constituting each detected outline is detected with respect to each detected outline, the detecting section 17A measures a length of each of the detected basic graphics, detects a basic graphic in each of the detected basic graphics whose length is a predetermined criterion value or more, such as 300 pixels or more (step S133 in FIG. 26), and executes the expanding process on the detected basic graphic so as to thicken a line of this basic graphic (step S134).

Next, the detecting section 17A calculates a ratio of the length of each basic graphic constituting each outline to the length of each of the detected outlines with respect to each detected outline (step S135), and detects an outline that meets a predetermined criterion such that the calculated ratio of each of the detected outlines is, for example, 75% or more, so as to detect a region inside the outline ("the basic graphic region") as the attention region (step S136). That is to say, the detecting section 17A uses a ratio of the lengths of one or more kinds of predetermined basic graphics constituting an outline of the base image 21 to the length of the outline that is a geometric condition of the base image 21 as the determination condition for detecting the attention region so as to detect the attention region on the base image 21.

Figure 11:
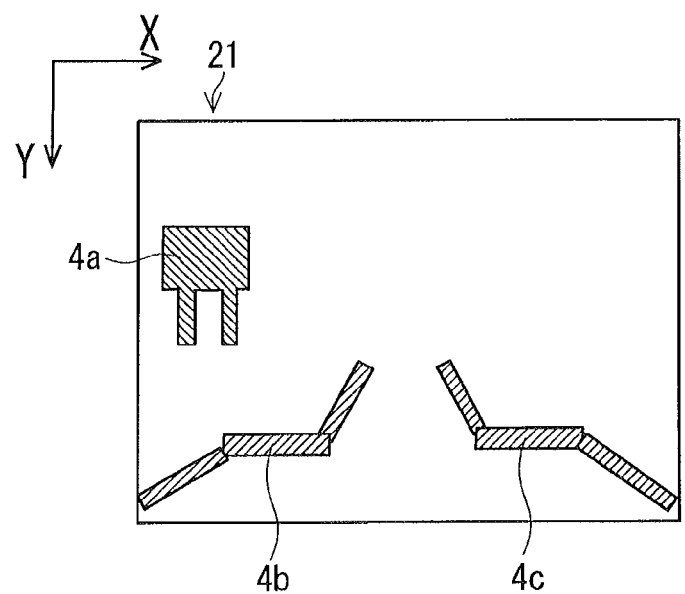
FIG. 11 is a diagram illustrating one example of an attention region.

Most of the basic graphic region normally may include a basic graphic having a boundary along the second direction (the Y-axial direction in FIG. 11). Therefore, when the process for reducing dispersion of the first pieces of distance information 27 (the original distance image 31) is executed on the original distance image 31, a fluctuation in pieces of distance information easily occurs on the boundary portion of the basic graphic region along the second direction in comparison with the basic graphic region. That is to say, the basic graphic region is a region where image distortion on the pseudo image 24 is likely to occur in comparison with the region other than the basic graphic region.

FIG. 11 is a diagram illustrating one example of the attention region detected on the base image 21 (FIG. 3). In FIG. 11, the attention regions 4a, 4b and 4c are detected by the process for detecting an attention region according to the detection of the basic graphic region executed by the detecting section 17A. The attention region 4a is a basic graphic region corresponding to an image of the vertical signboard included in the region 5a (FIG. 3) of the base image 21, and the attention regions 4b and 4c are basic graphic regions corresponding to an outer edge portion of a pathway image on the base image 21. The base image 21 in FIG. 11 shows only the attention regions that are detected for easy understanding.

Further, the detecting section 17A detects closed graphics such as a triangle and a square constituted by at least three basic graphics based on, for example, characteristic point information such as a refraction point detected from point sequence information of a segment constituting the outline of the base image 21 according to the set operation mode, and can also execute a process for detecting an oblong region containing the detected closed graphics in a ratio of the reference value or more as the attention region on the base image 21.

Figure 12:
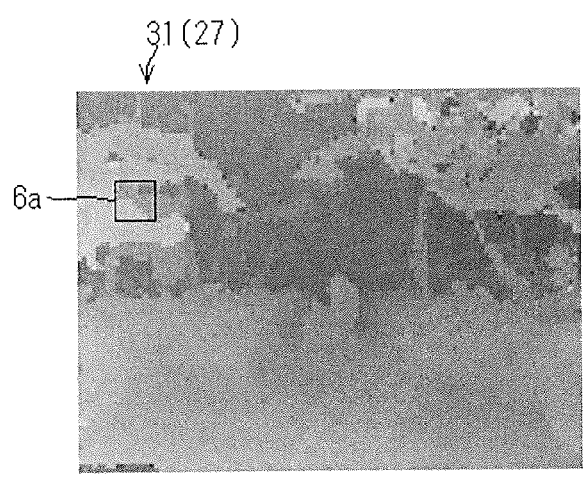
FIG. 12 is a diagram illustrating one example of a block region set on the original distance image.

The Process for Detecting Attention Region Based on Perspective Conflict Region:

FIG. 27 is a diagram describing an operation flow S130b in which the detecting section 17A detects a perspective conflict region, described later, as the attention region. When a process in step S130 is started and an operation mode for detecting the perspective conflict region as the attention region is set, the operation flow S130b in FIG. 27 is started. First the detecting section 17A sets one or more block regions such as oblong regions on the original distance image 31 (step S141 in FIG. 27). FIG. 12 is a diagram illustrating one example of a block region 6a set on the original distance image 31. The block region 6a is an oblong region with, for example a size of 320×320 pixels.

Figure 13:
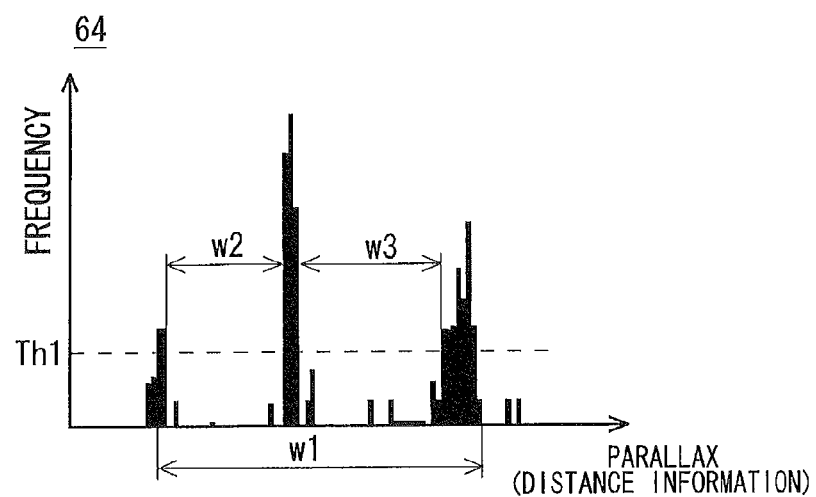
FIG. 13 is a diagram illustrating one example of distribution of the distance information in a block region.

When each block region is set, the detecting section 17A selects one of the set block regions (step S142), and obtains a statistical distribution state of pieces of distance information corresponding to the selected block region (step S143). FIG. 13 is a histogram 64 illustrating one example of the statistical distribution state of the distance information on the block region 6a (FIG. 12), and an abscissa axis of the histogram 64 represents separated parallax (distance information) as a variable, and an ordinate axis represents a frequency (number) of pixels belonging to each zone of the separated parallax.

When, for example, the block region 6a is set on the region 5a of the base image 21 (FIG. 3), the vertical signboard and trees that are positioned separately on a side of the stereo camera 300 with respect to the vertical signboard or on an opposite side are imaged simultaneously on the block region 6a. When such a distribution of the pieces of distance information about pixels of the block region 6a is expressed as a histogram where parallax (distance information) is a variable, a peak of the frequency distribution appears discretely (discontinuously) in the histogram as illustrated on the histogram 64, and a distribution width of the distance information becomes wide.

As shown on the histogram 64, when the peak of the frequency distribution appears discretely on the histogram where the parallax (distance information) is a variable, and the distribution width of the distance information is wide, a target region expressed as a histogram is normally a region where a closer object and a farther object whose distances from the stereo camera 300 are discrete coexist like the region 5a of the base image 21.

In the present application, this region is called also "perspective conflict region", and the statistical distribution state of the distance information on the perspective conflict region is also called "a perspective conflict state". The detecting section 17A detects the perspective conflict region detected based on the statistical distribution state of the distance information on the original distance image 31 as the attention region.

The distribution of the distance information is normally wider on the perspective conflict region than regions other than the perspective conflict region, and the distribution state of the distance information is also discrete. Therefore, when the process for reducing dispersion of e the first pieces of distance information 27 (the original distance image 31) is executed on the original distance image 31, the fluctuation in the distance information occurs at the boundary portion along the second direction on the perspective conflict region more easily than regions other than the perspective conflict region. That is to say, the perspective conflict region is a region where image distortion is likely to occur on the pseudo image 24 in comparison with regions other than the perspective conflict region.

A width w1 in the histogram 64 is a distribution width of parallax (distance information) corresponding to each pixel other than pixels that rank in the top 5% of all and in the bottom 5% of all when all the pixels belonging to the block region 6a are counted in decreasing order of parallax. The pixels that rank in the top 5% of all and in the bottom 5% of all are removed in order to remove pixels where obtained distance information is greatly different from actual distance information due to an error of searching for the corresponding points on the base image 21 and the reference image 22.

Further, widths w2 and w3 in the histogram 64 are distribution widths of parallax (distance information) corresponding to continuous zones in each parallax zone whose frequency is lower than a predetermined threshold th1 with respect to the frequency. When the width w2 or w3 is large, the distribution of the parallax on the block region 6a is discrete.

Therefore, the detecting section 17A obtains, for example, at least one of the width w1 and the width w2 (w3) on the histogram 64 as an index value expressing the statistical distribution state of pieces of distance information on each of the block regions of the original distance image 31. Further, even when the detecting section 17A adopts, for example, a standard deviation of pieces of distance information on the block region of the original distance image 31 as the index value expressing the statistical distribution state of the pieces of distance information, a determination whether the block region is the perspective conflict region can be made. For this reason, the usability of the present invention is not deteriorated.

When obtaining the statistical distribution state of pieces of distance information corresponding to the selected block region, the detecting section 17A determines whether the obtained statistical distribution state of pieces of distance information meets a predetermined criterion defining a degree of the perspective conflict (step S144 in FIG. 27). Concretely, the detecting section 17A obtains, for example, the width w1 as an index value expressing the statistical distribution state of pieces of distance information on the selected block region, and determines whether the width w1 is the predetermined criterion value or more, namely, the statistical distribution state of pieces of distance information on the block region meets the predetermined criterion defining the degree of the perspective conflict.

As a result of the judgment, the statistical distribution state of pieces of distance information on the block region meets the predetermined criterion defining the degree of the perspective conflict, the detecting section 17A detects the block region as the attention region in the perspective conflict state (step S145).

The detecting section 17A checks whether the determination in step S145 is completed for all the block regions set on the original distance image 31 (step S146). As a result of the check, when the determination in step S145 is not completed for all the block regions, the detecting section 17A returns the process to step S142. As a result of the check in step S146, when the determination in step S145 is completed for all the block regions, the detecting section 17A ends the process for detecting the attention region of the original distance image 31. As described above, the detecting section 17A detects the attention region on the original distance image 31 using the statistical distribution state of pieces of distance information on the original distance image 31 as the determination condition.

Figure 14:
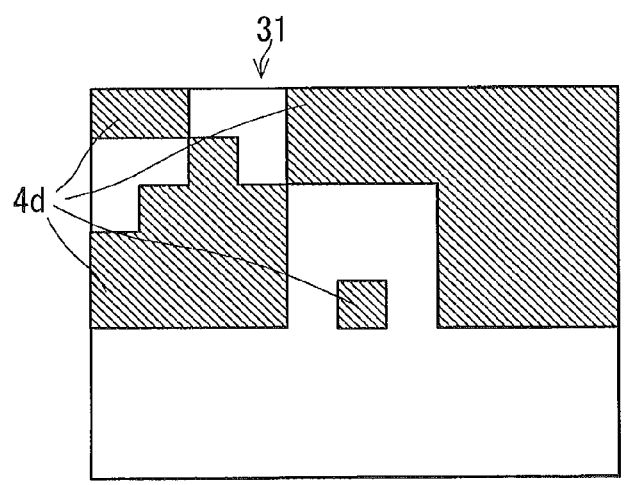
FIG. 14 is a diagram illustrating one example of the attention region.

FIG. 14 is a diagram illustrating an attention region 4d as one example of the attention region detected on the original distance image 31. The attention region 4d is detected by the detecting section 17A that adopts the width w1 as the statistical distribution state of pieces of distance information on the selected block region. The attention region 4d includes also a block region where the distance information gently fluctuates and the distribution width of the distance information meets the predetermined criterion besides the block region as the perspective conflict region. As described above, when the detecting section 17A adopts the width w2 (w3), a standard deviation of pieces of distance information on the block region, a combination of them, or a combination including the combination of the width and the standard deviation and the width w1 as the state of the statistical distribution of pieces of distance information on the selected the block region, a size of the attention region detected on the original distance image 31 is smaller than that of the attention region 4d (FIG. 14), and detection accuracy on the attention region in the perspective conflict state can be heightened.

Figure 15:
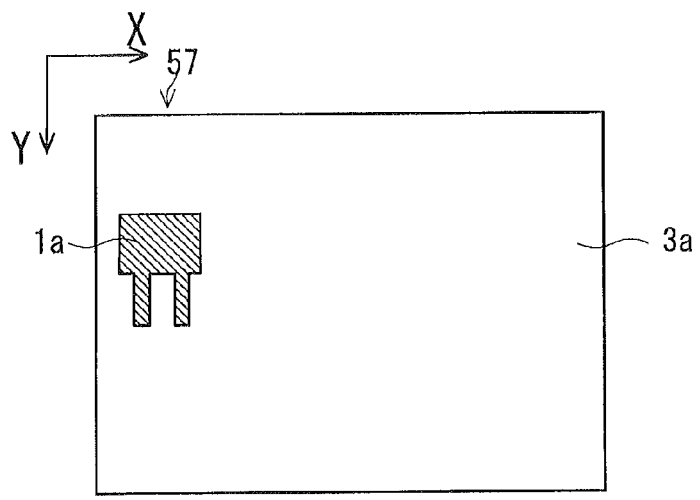
FIG. 15 is a diagram illustrating one example of the attention region.

FIG. 15 is a diagram illustrating an attention region 1a as another example of the attention region. The detecting section 17A detects a region where the attention regions 4a to 4c (FIG. 11) detected on the base image 21 (FIG. 11) are overlapped with the attention region 4d detected on the original distance image 31 (FIG. 14) as the attention region 1a in an image space 57 (FIG. 15). The non-attention region 3a is a region on the image space 57 other than the attention region 1a. The image space 57 is an image space corresponding to the derived distance image 32 (the second pieces of distance information 28). The image space 57 corresponds to the base image 21 (FIG. 3), the reference image 22 (FIG. 4) and to the original distance image 31 (FIG. 7).

When the attention region 1a in the image space 57 is detected based on the overlapped region of the attention regions 4a to 4c detected on the base image 21 and the attention region 4d detected on the original distance image 31 in such a manner, a region that is a base image region and the perspective conflict region can be detected as the attention region 1a.

Even when a method for detecting the attention region based on, for example, any one of the attention regions 4a to 4c and the attention region 4d is adopted instead of the method for detecting the attention region 1a based on the overlapped region of the attention regions 4a to 4c and the attention region 4d, the usability of the present invention is not deteriorated. Further, this method enables the process for detecting the attention region to be executed at a higher speed.

Further, even when a method for detecting the attention region based on the combined region of the attention regions 4a to 4c detected on the base image 21 and the attention region 4d detected on the original distance image 31 is adopted, a wide-range region where the base image region and the perspective conflict region are combined with each other is detected as the attention region, so that likelihood that occurrence of distortion on a pseudo image to be generated can be suppressed can be heightened. For this reason, the usability of the present invention is not deteriorated.

The Process for Detecting the Attention Region Based on Correlating Value in Correspondence Point Search:

The detecting section 17A executes a process for detecting the attention region in the image space corresponding to the original distance image 31 using each correlating value obtained for the first pieces of distance information 27 at a time when the corresponding point searching process is executed between the base image 21 and the reference image 22 and the first pieces of distance information 27 is obtained, as the determination condition according to the set operation mode.

A region on the original distance image 31 corresponding to the first pieces of distance information 27 where the correlating value is low, is a region where dispersion of the first pieces of distance information 27 is larger than that on a region where each of the correlating values is large. Therefore, when the process for reducing the dispersion of the first pieces of distance information 27 (the original distance image 31) on the original distance image 31 is executed, a fluctuation in the distance information on the boundary along the second direction is more likely to occur on a region where each of the correlating values corresponding to the first pieces of distance information 27 is low than on a region where each of the correlating values is large. That is to say, the region where each of the correlating values corresponding to the first pieces of distance information 27 is small is a region where likelihood that image distortion occurs on the pseudo image 24 more easily than a region where each of the correlating values corresponding to the first pieces of distance information 27 is larger.

Region information 2a (FIG. 2) about the attention region detected by the detecting section 17A is supplied to the first generating section 14A. Therefore, the first generating section 14A, described later, refers to the region information 2a so as to be capable of detecting the attention region on the original distance image 31. When the operation mode of the first generating section 14A is set to an operation mode using the region information 2a, the first generating section 14A generates the second pieces of distance information 28 on at least the attention region in the image space of the original distance image 31 so that the reduction strength for reducing the dispersion of the first pieces of distance information 27 in the second direction on the attention region is stronger than the reduction strength for reducing the dispersion in the first pieces of distance information 27 in the first direction on the attention region.

The first generating section 14A executes the process for reducing the dispersion in the case where the reduction strengths of the dispersion of the first pieces of distance information 27 in the first direction and the second direction are different from each other on, for example, only the attention region on the original distance image 31 so that the image distortion on the region of the pseudo image corresponding to the attention region can be suppressed while an excessive reduction in the distance information on a region other than the attention region is being prevented.

Figure 16:
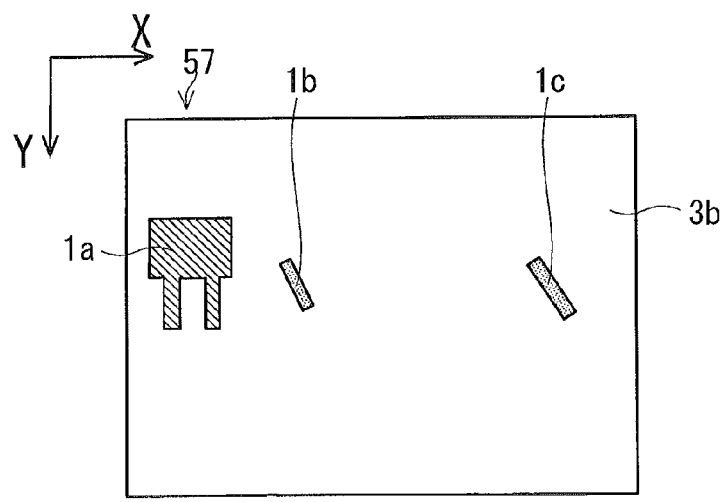
FIG. 16 is a diagram illustrating one example of a plurality of attention regions.

Generation of Quantitative Determined Result about Likelihood that Distortion of Simulated Image Occurs on the Attention Region:

FIG. 16 is a diagram illustrating one example of a plurality of attention regions detected in an image space 57, and the three attention regions 1a to 1c included in the non-attention region 3b are detected in the image space 57. Quantitative determined results about the likelihood that image distortion occurs in the image space of the pseudo image 24 corresponding to the attention regions 1a to 1c are given to the attention regions 1a to 1c, respectively.

Obtaining of the quantitative determined result carried out by the detecting section 17A is described below. In the operation flow S130a where the detecting section 17A shown in FIG. 26 detects the attention region on the base image 21, as at least one of a reference value of a length of a basic graphic in step S133 and a reference value of a ratio (proportion) of the detected length of the basic graphic to the length of the outline detected on the base image 21 in step S136 is made to be larger, reliability of detected presence of the basic graphic on the attention region is higher.

Similarly, in an operation flow S130b where the detecting section 17A shown in FIG. 27 detects the attention region in the perspective conflict state on the distance image 33, as the reference value defining the degree of the perspective conflict of the statistical distribution state of pieces of distance information such as the width w1 in step 144 is made to be larger, the reliability of the presence of the perspective conflict state on the attention region detected on the distance image 33 is higher.

Therefore, as the reference value in steps S133 and S136 in FIG. 26, or step S144 in FIG. 27 is made to be larger, the reliability of the attention region in the image space 57 detected by the detecting section 17A is also higher.

Therefore, in the case where the operation mode for obtaining the quantitative determined result is set, on detecting the attention region detected in the image space 57, the detecting section 17A obtains a value according to the reference value in steps S133 and S136 in FIG. 26, or step S144 in FIG. 27 as the quantitative determined result (reliability) about the likelihood that image distortion occurs in the image space of the pseudo image 24 on the attention region. The detecting section 17A relates the obtained quantitative determined result to the detected attention region. That is to say, the detecting section 17A can use a determination rule, which is given to the attention region where the quantitative determined result of the likelihood that image distortion occurs in the image space of the pseudo image 24 on the attention region is detected, as the determination condition for detecting the attention region. The quantitative determined result given to the detected attention region as well as the region information 2a on the attention region is supplied to the first generating section 14A.

When the first generating section 14A is set to the operation mode using the region information 2a, and further the first generating section 14A is set to the operation mode for seeing the quantitative determined result of the likelihood that image distortion occurs, in the case where the likelihood that image distortion of the pseudo image 24 occurs on the attention region is assumed to be high based on, for example, the quantitative determined result of the likelihood that the image distortion occurs, the first generating section 14A increases the reduction strength for reducing the dispersion of the first pieces of distance information 27 in the second direction on the attention region, in comparison with a case where the likelihood is low. The first generating section 14A prevents excessive reduction in distance information on the attention region, and simultaneously can suppress image distortion on a region of the pseudo image corresponding to the attention region using the quantitative determined result of the likelihood of occurrence of distortion.

Operation of the First Generating Section 14A:

Reducing Process A:

When the operation mode of the first generating section 14A (FIG. 2) is not set to the operation mode using the region information 2a (FIG. 2), the first generating section 14A executes a reducing process A for reducing the dispersion of the first pieces of distance information 27 in the entire region of the image space on the original distance image 31 so that the strength for reducing the dispersion of the first pieces of distance information 27 in the second direction (the Y-axial direction in FIG. 7) crossing the first direction (the X-axial direction in FIG. 7) on the original distance image 31 is stronger than strength for reducing the dispersion of the first pieces of distance information 27 in the first direction on the original distance image 31, and generates the second pieces of distance information 28 (FIG. 2).

When the reducing process A is executed, the dispersion of pieces of distance information in the second direction crossing the first direction is smaller than the dispersion of pieces of distance information in the first direction on the second pieces of distance information 28 generated by the first generating section 14A. The second generating section 15A, described later, generates the pseudo image 24 (FIG. 2) based on the generated second pieces of distance information 28. Therefore, when the first generating section 14A executes the reducing process A, distortion such as a curve of an image generated on the pseudo image 24 can be reduced in comparison with a case where the first generating section 14A sees the averaging filter 55 shown in FIG. 8, and FIG. 9 and FIG. 10 and executes the general smoothing process, namely, a general reducing process for reducing the dispersion of the first pieces of distance information 27 so that the smoothing strengths of the first direction and the second direction are equal to each other and generates the second pieces of distance information 28.

Reducing Process B:

Further, when the operation mode of the first generating section 14A is set to the operation mode using the region information 2a, the first generating section 14A executes a reducing process B for reducing the dispersion of the first pieces of distance information 27 on at least the attention region detected based on the region information 2a in the image space of the original distance image 31 so that the reduction strength for reducing the dispersion of the first pieces of distance information 27 in the second direction on the attention region is stronger than the reduction strength for reducing the dispersion of the first pieces of distance information 27 in the first direction on the attention region so as to generate the second pieces of distance information 28.

When the reducing process B is executed, the dispersion of the second pieces of distance information 28 generated by the first generating section 14A in the second direction crossing the first direction is smaller than the dispersion of pieces of the distance information in the first direction on at least the attention region detected based on the region information 2a. The second generating section 15A, described later, generates the pseudo image 24 (FIG. 2) based on the generated second pieces of distance information 28.

Here, the attention region on the original distance image 31 is a region where likelihood that image distortion on the corresponding region of the pseudo image 24 is higher than that on a non-attention region other than the attention region. Therefore, when the first generating section 14A executes the reducing process B, distortion such as a curve of an image generated on the pseudo image 24 generated based on the second pieces of distance information 28 can be reduced in comparison with a case where the first generating section 14A executes the general reducing process in which the smoothing strength is equal to each other in the first direction and the second direction in the description of the reducing process A.

Further, the first generating section 14A executes the reducing process B, an excessive reduction in distance information on a region other than the attention region is prevented, and simultaneously the image distortion on the pseudo image corresponding to the attention region can be suppressed.

Even when the first generating section 14A executes any of the reducing process A and the reducing process B, the distortion such as a curve of the image generated on the pseudo image 24 generated based on the second pieces of distance information 28 can be reduced in comparison with the case where the first generating section 14A executes the general reducing process in which the smoothing strength is equal to each other in the first direction and the second direction. For this reason, the usability of the present invention is not deteriorated.

Therefore, the operation of the reducing process B to be performed by the first generating section 14A is mainly described, and the reducing processes A and B are described below. In the description, a case where the detecting section 17A detects the attention region 1a shown in FIG. 15 is exemplified. The operation flow S100A shown in FIG. 25 is an operation flow in the case where the operation mode of the first generating section 14A is set to the operation mode corresponding to the reducing process B.

Processing Contents of the Reducing Process B (A):

When the first pieces of distance information 27 (FIG. 2) and the region information 2a (FIG. 2) of the attention region 1a (FIG. 15) are supplied from the second obtaining section 13 and the detecting section 17A, the first generating section 14A obtains smoothing information 53a and smoothing information 53b (FIG. 2) corresponding to first and second smoothing filters, respectively, that are applied to the non-attention region 3a and the attention region 1a, respectively, from the smoothing information storage section 48 (FIG. 2), so as to obtain the first and second smoothing filters (step S140 in FIG. 25). The smoothing information 53a and 53b is information for specifying the first and second smoothing filters that are applied to the non-attention region 3a and the attention region 1a, respectively. The smoothing information 53a and 53b are stored in the smoothing information storage section 48 (FIG. 1 and FIG. 2) in advance.

For example, a type of the smoothing filter, and the smoothing strength of the smoothing filter are adopted as the smoothing information. For example, when a median filter is used as a first smoothing filter and an averaging filter is used as the second smoothing filter, a variable for specifying the type of the median filter and a variable for specifying the smoothing strength of this filter are adopted as the smoothing information 53a, and a variable for specifying a type of the averaging filter and a variable for specifying the smoothing strength of this filter are adopted as the smoothing information 53b.

Figure 19:
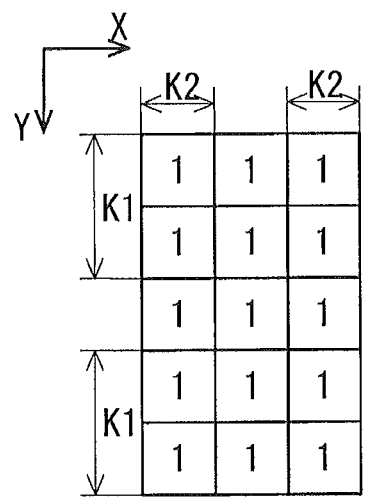
FIG. 19 is a diagram illustrating one example of the averaging filter according to the embodiment.
Figure 20:
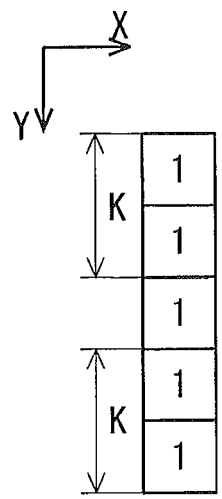
FIG. 20 is a diagram illustrating one example of the averaging filter according to the embodiment.
Figure 21:
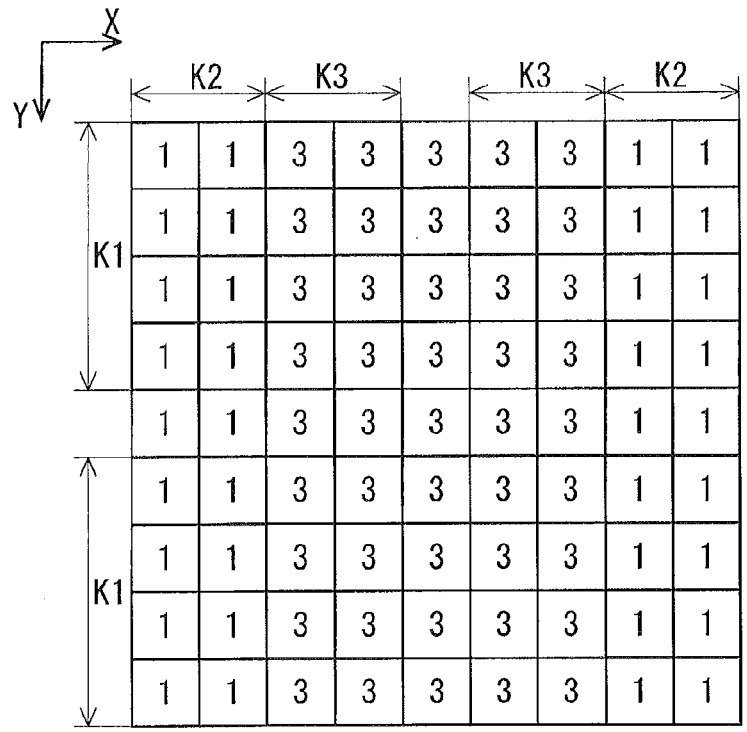
FIG. 21 is a diagram illustrating one example of the averaging filter according to the embodiment.
Figure 22:
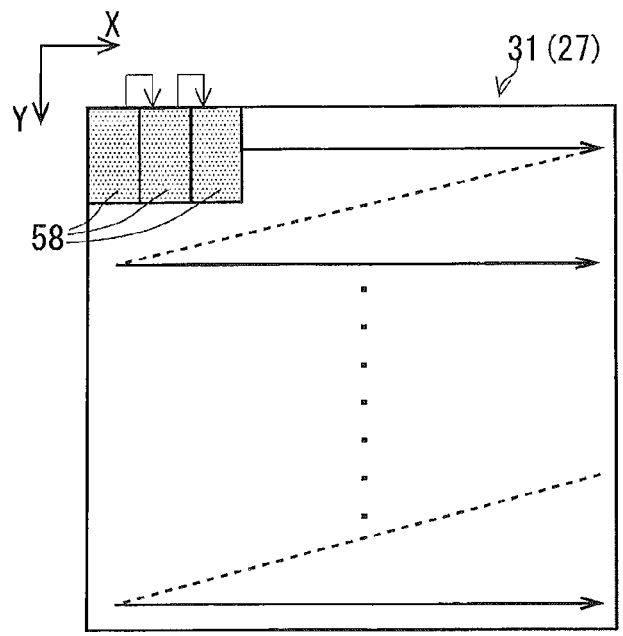
FIG. 22 is a diagram describing one example of a process for reducing dispersion of the distance information according to the embodiment.

FIGS. 19 to 21 are diagrams illustrating examples of averaging filters 56a, 56b, and 56c according to the embodiment. Further, FIG. 22 is a diagram describing one example of the process for reducing dispersion of the original distance image 31 (the first pieces of distance information 27) according to the embodiment.

An operation of the first generating section 14A is described bellow by exemplifying a case where the averaging filter 55 shown in FIG. 8 is adopted as the first smoothing filter, and the averaging filter 56a shown in FIG. 19 is mainly adopted as the second smoothing filter.

Concretely, the first generating section 14A obtains, for example, information for specifying a type of the averaging filter 55 and the parameter K of value 94 as the smoothing information 53a about the averaging filter 55. Further, the first generating section 14A obtains, for example, information for specifying a type of the averaging filter 56a and the parameters K 1 and K2 of values 189 and 64 as the smoothing information 53b about the averaging filter 56a. When the first generating section 14A executes the reducing process A, the first generating section 14A obtains only the smoothing information 53b corresponding to the averaging filter 56a.

Further, the first generating section 14A may obtain each of programs of the smoothing processes corresponding to each of the smoothing processes using the first and second smoothing filters as the smoothing information 53a and the smoothing information 53b from the smoothing information storage section 48, and may execute each of the obtained smoothing process programs so as to execute each of the smoothing processes using the first and second smoothing filters.

When the smoothing process using the averaging filter 56a defined by the parameters K 1 and K2 of values 189 and 64 is applied to the original distance image 31 (FIG. 7), the reduction strength of the dispersion of the first pieces of distance information 27 in the second direction (the Y-axial direction) crossing the first direction (the X-axial direction) is about three-times as strong as the reduction strength of the dispersion of pieces of distance information 27 in the first direction (the X-axial direction). A ratio of the strength is not limited to three times, and even if, for example, any value in values of 1.2 times or more is adopted, the usability of the present invention is not deteriorated.

Even when the averaging filter 56b (FIG. 20) is adopted instead of the averaging filter 56a, the usability of the present invention is not deteriorated. In the averaging filter 56b, for example, value 94 is adopted as the parameter K. When the first generating section 14A adopts the averaging filter 56a, the first generating section 14A reduces the dispersion of the first pieces of distance information 27 on the original distance image 31 only in the second direction of the first direction and the second direction so as to execute the reducing process B (A). That is to say, even when the averaging filter 56b is applied, the reduction strength of the dispersion of pieces of distance information in the second direction can be made to be stronger than the reduction strength the dispersion of pieces of distance information in the first direction.

Further, even when the averaging filter 56c (FIG. 21) is adopted instead of the averaging filter 56a, the usability of the present invention is not deteriorated. In the averaging filter 56b, for example, value 189, value 94, and value 95 are adopted as the parameters K 1, K2, and K3, respectively. In the averaging filter 56c, value 3 is adopted as a value of each of the matrix elements at the center in the X-axial direction, and value 1 is adopted as a value of each of the matrix elements at both ends in the X-axial direction. In the averaging filter 56c, the number of elements is equal to each other in X-axial and Y-axial directions, but since the value of the element differs between the center and both ends, even if the averaging filter 56c that is a weighted averaging filter is adopted, the reduction strength of the dispersion of pieces of distance information in the second direction can be made to be stronger than the reduction strength of the dispersion of pieces of distance information in the first direction.

Even when the first generating section 14A executes a process for setting, as shown in FIG. 22, a block region 58 having a vertically long shape where a length in the second direction (the Y-axial direction) is longer than a length in the first direction (the X-axial direction) to the original distance image 31, and obtaining an average value of the pieces of distance information corresponding to the block region 58 in the first pieces of distance information 27, and obtaining values of pieces of distance information corresponding to the block region 58 in the second pieces of distance information 28 based on the obtained average value with the block region 58 being moved step by step with respect to the original distance image 31, as shown in FIG. 22, to the first direction and the second direction so as to execute the reducing process B (A), the usability of the present invention is not deteriorated. As to the size of the block region 58, for example, 4 is adopted as the number of pixels in the first direction (the X-axial direction), and 8 is adopted as the number of pixels in the second direction (the Y-axial direction).

When the operation mode is set to the operation corresponding to the reducing process B and an operation mode for seeing a quantitative determined result of the likelihood that the image distortion occurs generated by the detecting section 17A is set, the first generating section 14A obtains the first and second smoothing filters and adjusts the smoothing strength of the second smoothing filter (step S150 in FIG. 25). In the adjustment, for example, when the attention region 1a is assumed that image distortion on the pseudo image 24 is likely to occur based on the quantitative determined result of the likelihood of occurrence of the image distortion, the reduction strength for reducing the dispersion of the first pieces of distance information 27 on the attention region 1a in the second direction is strengthened further in comparison with a case where the likelihood is low. That is to say, the first generating section 14A changes the reduction strength for reducing the dispersion of the first pieces of distance information 27 on the attention region 1a in the second direction according to the quantitative determined result of the likelihood of the occurrence of the distortion supplied from the detecting section 17A. In the adjustment of the smoothing strength in step S150, a ratio of the reduction strength of the dispersion of the pieces of distance information 27 in the second direction to the reduction strength of the dispersion of the first pieces of distance information 27 in the first direction is adjusted according to the quantitative determined result of the likelihood of occurrence of the distortion within a range of, for example, 1.2 or more. Thus the first generating section 14A prevents excessive reduction in the distance information on the attention region, and simultaneously can suppress image distortion on a region corresponding to the attention region on the pseudo image 24 generated by the second generating section 15A using the quantitative determined result of the likelihood of occurrence of distortion.

Figure 17:
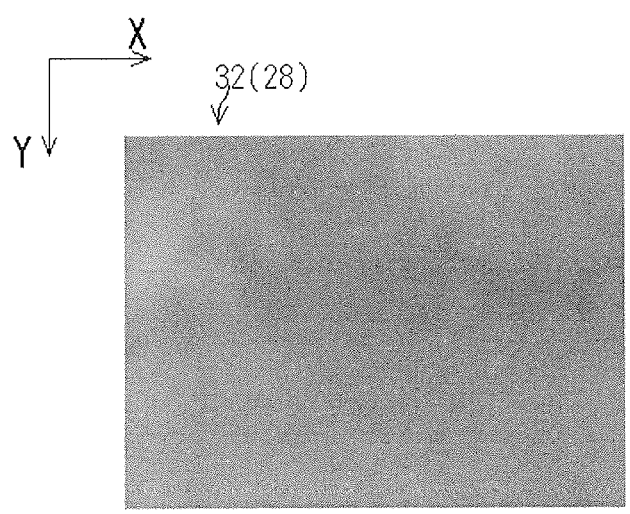
FIG. 17 is a diagram illustrating one example of a derived distance image.

FIG. 17 is a diagram illustrating one example of the derived distance image 32 (the second pieces of distance information 28). When the smoothing filter is obtained and the necessary adjustment of the smoothing strength is ended, the first generating section 14A executes the smoothing process using the obtained smoothing filter so as to smooth the pixel values of the pixels of the original distance image 31 (the first pieces of distance information 27) and generate the derived distance image 32 (the second pieces of distance information 28) (step S160 in FIG. 25). That is to say, the first generating section 14A executes the reducing process for reducing the dispersion of the first pieces of distance information 27 so that the strength for reducing the dispersion of the first pieces of distance information 27 on the original distance image 31 in the second direction crossing the first direction is stronger than the strength for reducing the dispersion of the first pieces of distance information 27 on the original distance image 31 in the first direction.

Even when the first generating section 14A executes the reducing process B (A) by applying, for example, the smoothing process in which the smoothing strengths indicated in the averaging filter 55 are equal to each other in the first direction and the second direction to the entire region of the original distance image 31, and then applying the smoothing filter where the smoothing strength indicated in the averaging filters 56a to 56c in the second direction is stronger than the smoothing strength in the first direction, the usability of the present invention is not deteriorated.

Further, the second direction is perpendicular to the first direction in the averaging filters 56a to 56c, but even if a smoothing filter which copes with the smoothing process in which the second direction is present within a range of −30° to +30° with respect to the perpendicular direction, the usability of the present invention is not deteriorated.

Figure 18:
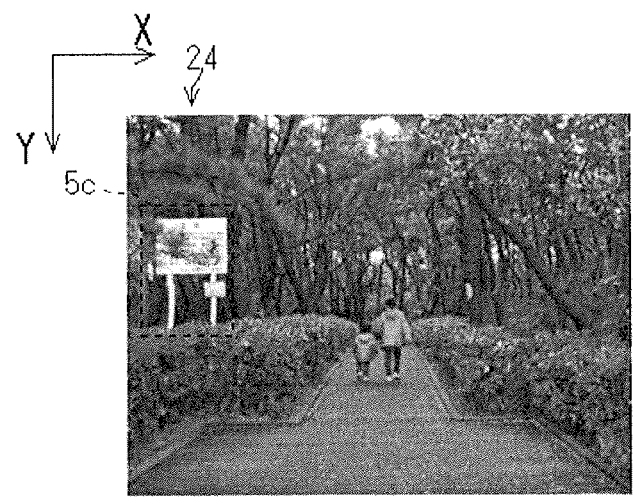
FIG. 18 is a diagram illustrating one example of a pseudo image whose image distortion is suppressed.

Operation of the Second Generating Section 15A:

FIG. 18 is a diagram illustrating one example of the pseudo image 24 (FIG. 2) where image distortion is suppressed. The second generating section 15A generates the pseudo image 24 (FIG. 18) based on the base image 21 (FIG. 3) and the pieces of second distance information 28 (the derived distance image 32) (FIG. 17) (step S170 in FIG. 25). That is to say, the second generating section 15A generates the pseudo image 24 constituting a stereoscopic image in combination with the base image 21 based on the base image 21 and the second pieces of distance information 28. Concretely, the second generating section 15A adopts the basic method for generating a pseudo image with reference to, for example, FIG. 23, FIG. 24 and the formula (2), and transforms the base image 21 based on distance information (parallax) of the derived distance image 32 (the second pieces of distance information 28) supplied from the first generating section 14A so as to obtain the pseudo image 24 corresponding to image-capturing of an object from the virtual viewpoint.

A region 5c on the pseudo image 24 is a region that corresponds to the region 5a on the base image 21 (FIG. 3) and the region 5b on the pseudo image 25 (FIG. 10) whose image distortion is not corrected. On the image on the region 5c, spatial distortion of an image that curves into a convex shape in the −X direction is suppressed on the region 5b.

The image processing apparatus 200A executes the reducing process for reducing the dispersion of the first pieces of distance information 27 so that the strength for reducing the dispersion of the first pieces of distance information 27 on the original distance image 31 (FIG. 7) in the second direction (the Y-axial direction in FIG. 7) crossing the first direction (the X-axial direction in FIG. 7) is stronger than the strength for reducing the dispersion of the first pieces of distance information 27 on the original distance image 31 in the first direction so as to generate the second pieces of distance information 28.

In the second pieces of distance information 28 generated by the image processing apparatus 200A, the dispersion of the pieces of distance information in the second direction crossing the first direction, namely, the dispersion of the pieces of distance information in the second direction that is a main cause of the shape distortion on the pseudo image is smaller than the dispersion of the pieces of distance information in the first direction. Since the image processing apparatus 200A generates the pseudo image 24 based on the generated second pieces of distance information 28, the distortion such as a curve of an image generated on the pseudo image 24 can be reduced. That is to say, the image processing apparatus 200A can reduce the distortion of the image generated on the pseudo image.

Modified Example

The embodiment of the present invention is described above, but the present invention is not limited to the above embodiment, and various modifications can be carried out.

For example, in the stereo camera 300 of the image processing system 100A, the direction of the base line length between the base camera 61 and the reference camera 62 is a vertical direction, but the direction of the base line length may be any direction other than the vertical direction. Further, imaging magnifications of the base camera 61 and the reference camera 62 do not have to be the same as each other. When the direction of the base line length between the base camera 61 and the reference camera 62 is the horizontal direction, for example, roles for the base camera and the reference camera in the pseudo image 24 are switched, and the pseudo image 24 may be generated from images imaged by the respective cameras.

EXPLANATIONS OF LETTERS OR NUMERALS 100A image processing system
200A image processing apparatus
300 stereo camera
1a, 1b, 1c attention region
2a region information
3a, 3b non-attention region
4a to 4d attention region
6a block region
9a, 9b parallax
21, 21a base image
22, 22a reference image
23a, 23b partial image
24 pseudo image
25 pseudo image
27 first pieces of distance information
28 second pieces of distance information
29 pieces of distance information
31 original distance image
32 derived distance image
33 distance image
53a, 53b smoothing information
55, 56a to 56c averaging filter
57 image space
61 base camera
62 reference camera
w1, w2, w3 width
th1 threshold

The invention claimed is:

1. An image processing apparatus, comprising:
a first obtaining section for obtaining a base image in which an object is captured;
a second obtaining section for obtaining first pieces of distance information each representing distance information of a distance from a predetermined origin position to each of points on said object corresponding to respective pixels of said base image;
a first generating section for generating second pieces of distance information by executing a reducing process for reducing dispersion of said first pieces of distance information; and
a second generating section for generating a pseudo image constituting a stereoscopic image in combination with said base image based on said base image and said second pieces of distance information, wherein when said base image and said pseudo image are arranged so as to be stereoscopically viewable in one image space, a first direction with respect to said base image is defined by a displacement direction in the image space between the pixel of said base image and the pixel of said pseudo image, they each being corresponding to the same point on said object, and an original distance image is defined by an arrangement of said first pieces of distance information corresponding to a pixel arrangement of said base image, said first generating section executes said reducing process so that strength for reducing the dispersion of said first pieces of distance information in a second direction crossing said first direction on said original distance image is stronger than strength for reducing the dispersion of said first pieces of distance information in said first direction on said original distance image.

2. The image processing apparatus according to claim 1, wherein
said first generating section executes a smoothing filter process in which smoothing strengths in said first direction and said second direction are different from each other so as to execute said reducing process.

3. The image processing apparatus according to claim 1, wherein
said first generating section executes a process for setting a block region having a vertically long shape such that a length in said second direction is longer than a length in said first direction on said original distance image so as to obtain an average value of pieces of the distance information corresponding to the block region in said first pieces of distance information and obtaining values of pieces of distance information corresponding to the block region in said second pieces of distance information based on the obtained average value while the block region is being moved with respect to said original distance image step by step, so as to execute said reducing process.

4. The image processing apparatus according to claim 1, wherein
said first generating section reduces the dispersion of said first pieces of distance information only in said second direction of said first direction and said second direction on said original distance image so as to execute said reducing process.

5. The image processing apparatus according to claim 1, further comprising:
a detecting section for detecting an attention region, in the image space corresponding to said original distance image, where a distortion of said pseudo image is likely to occur based on a predetermined determination condition, wherein
said first generating section executes said reducing process on a region corresponding to said attention region on said original distance image.

6. The image processing apparatus according to claim 5, wherein said detecting section detects said attention region using a geometric condition of said base image as said determination condition.

7. The image processing apparatus according to claim 6, wherein
when a graphic whose shape and size in a coordinate space are specified by giving a concrete numerical value to a predetermined parameter of a mathematical formula is referred to as a basic graphic, said geometric condition is a ratio of one or more kinds of predetermined basic graphics constituting an outline on said base image.

8. The image processing apparatus according to claim 7, wherein said one or more kinds of predetermined basic graphics are at least any one of a straight line, a curve of second order, an arc, an elliptic arc, and a predetermined texture.

9. The image processing apparatus according to claim 5, wherein said detecting section detects said attention region using a state of a statistical distribution of said pieces of first distance information as said determination condition.

10. The image processing apparatus according to claim 5, wherein said second obtaining section executes a corresponding point searching process between a reference image in which said object is captured from a viewpoint different from the viewpoint from which said base image is imaged and said base image so as to obtain said first pieces of distance information,
said detecting section detects said attention region using each of correlating values obtained by said corresponding point searching process on said first pieces of distance information as said determination condition.

11. The image processing apparatus according to claim 5, wherein
said determination condition includes a determination rule for giving quantitative determined result of likelihood of occurrence of said distortion,
said first generating section changes reduction strength of said dispersion on said attention region in said second direction according to said quantitative determined result of the likelihood of occurrence of said distortion.

12. An image processing method, comprising:
a first obtaining step of obtaining a base image in which an object is captured;
a second obtaining step of obtaining first pieces of distance information each representing distance information of a distance from a predetermined origin position to each of points on said object corresponding to respective pixels of said base image;
a first generating step of generating second pieces of distance information by executing a reducing process for reducing dispersion of said first pieces of distance information; and
a second generating step of generating a pseudo image constituting a stereoscopic image in combination with said base image based on said base image and said second pieces of distance information,
wherein when said base image and said pseudo image are arranged so as to be stereoscopically viewable in one image space, a first direction with respect to said base image is defined by a displacement direction in the image space between the pixel of said base image and the pixel of said pseudo image, they each being corresponding to the same point on said object with each other, and an original distance image is defined by an arrangement of said first pieces of distance information corresponding to a pixel arrangement of said base image,
at said first generating step,
said reducing process is executed so that strength for reducing the dispersion of said first pieces of distance information in a second direction crossing said first direction on said original distance image is stronger than strength for reducing the dispersion of said first pieces of distance information in said first direction on said original distance image.

13. A non-transitory computer readable recording medium storing a computer-readable program, said program controlling a computer to execute an image processing method, and said image processing method comprising:
- a first obtaining step of obtaining a base image in which an object is captured;
- a second obtaining step of obtaining first pieces of distance information each representing distance information of a distance from a predetermined origin position to each of points on said object corresponding to respective pixels of said base image;
- a first generating step of generating second pieces of distance information by executing a reducing process for reducing dispersion of said first pieces of distance information; and
- a second generating step of generating a pseudo image constituting a stereoscopic image in combination with said base image based on said base image and said second pieces of distance information,
- wherein when said base image and said pseudo image are arranged so as to be stereoscopically viewable in one image space, a first direction with respect to said base image is defined by a displacement direction in the image space between the pixel of said base image and the pixel of said pseudo image each being corresponding to the same point on said object each other, and an original distance image is defined by an arrangement of said first pieces of distance information corresponding to a pixel arrangement of said base image,
- at said first generating step,
- said reducing process is executed so that strength for reducing the dispersion of said first pieces of distance information in a second direction crossing said first direction on said original distance image is stronger than strength for reducing the dispersion of said first pieces of distance information in said first direction on said original distance image.

* * * * *